(12) United States Patent
Sugano et al.

(10) Patent No.: US 9,767,097 B2
(45) Date of Patent: Sep. 19, 2017

(54) DISCLOSURE RANGE DETERMINATION METHOD, DISCLOSURE RANGE DETERMINATION APPARATUS, AND MEDIUM

(71) Applicant: FUJITSU LIMITED, Kawasaki (JP)

(72) Inventors: Hiroyasu Sugano, Koto (JP); Shinichi Shiotsu, Kawasaki (JP); Isamu Yamada, Kawasaki (JP); Akira Itasaki, Yokohama (JP); Daisuke Yamashita, Kawasaki (JP); Hideki Tanaka, Kawasaki (JP); Koichi Yokota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 1076 days.

(21) Appl. No.: 13/743,849

(22) Filed: Jan. 17, 2013

(65) Prior Publication Data

US 2013/0191322 A1 Jul. 25, 2013

(30) Foreign Application Priority Data

Jan. 25, 2012 (JP) .................................. 2012-013329

(51) Int. Cl.
G06F 17/30 (2006.01)
G06F 21/62 (2013.01)

(52) U.S. Cl.
CPC .... *G06F 17/30005* (2013.01); *G06F 21/6218* (2013.01)

(58) Field of Classification Search
CPC .............................................. G06F 17/30563
(Continued)

(56) References Cited

U.S. PATENT DOCUMENTS 8,555,403 B1 * 10/2013 Kilday .................... G06F 21/62
709/229
8,788,328 B1 * 7/2014 George .................. G06Q 90/00
705/14.1

(Continued)

FOREIGN PATENT DOCUMENTS

JP 2002-149529 5/2002
JP 2002-176419 6/2002
(Continued)

OTHER PUBLICATIONS

Japanese Office Action issued Jun. 2, 2015 in corresponding Japanese Patent Application No. 2012-013329.

*Primary Examiner* — Robert Beausoliel, Jr.
*Assistant Examiner* — Alexandria Bromell
(74) *Attorney, Agent, or Firm* — Staas & Halsey LLP

(57) ABSTRACT

A disclosure range determination method includes accepting a disclosure range of data and metadata of the data, extracting attribute information of a user that belongs to the disclosure range of the data accepted in the accepting based on association information associating a disclosure range of data with attribute information of a user that belongs to the disclosure range, converting the metadata accepted in the accepting into a keyword based on association information associating a conversion rule that converts the metadata into significant information with a keyword corresponding to the conversion rule, and determining, by a computer, whether or not a user that belongs to the disclosure range accepted in the accepting qualifies for the disclosure range accepted in the accepting, based on whether or not the keyword converted in the converting is included in the attribute information extracted in the extracting.

4 Claims, 25 Drawing Sheets

(58) Field of Classification Search
USPC .................... 707/602, 723, 783, 915, 918
See application file for complete search history.

(56) References Cited

U.S. PATENT DOCUMENTS

| | | | | |
|---|---|---|---|---|
| 8,793,768 | B2* | 7/2014 | Beck | G06F 19/322 |
| | | | | 726/4 |
| 2007/0150475 | A1 | 6/2007 | Hamada | |
| 2009/0157798 | A1* | 6/2009 | Laumen | H04W 4/08 |
| | | | | 709/203 |
| 2009/0313299 | A1* | 12/2009 | Bonev | G06Q 10/109 |
| | | | | 707/707 |
| 2010/0077017 | A1* | 3/2010 | Martinez | H04L 67/18 |
| | | | | 709/201 |
| 2012/0035924 | A1* | 2/2012 | Jitkoff | G01C 21/3608 |
| | | | | 704/235 |
| 2012/0117499 | A1* | 5/2012 | Mori | H04M 1/72569 |
| | | | | 715/765 |
| 2013/0124508 | A1* | 5/2013 | Paris | G06F 17/3028 |
| | | | | 707/723 |

FOREIGN PATENT DOCUMENTS

| | | |
|---|---|---|
| JP | 2007-114942 | 5/2007 |
| JP | 2007-172398 | 7/2007 |
| JP | 2009-26129 | 2/2009 |
| JP | 2011-197718 | 10/2011 |

* cited by examiner

FIG. 4

| GROUP ID | GROUP NAME | USER ID |
|---|---|---|
| 0001 | A COMPANY | 0001 |
| 0002 | B COMPANY | 0002 |
| 0003 | C COMPANY | 0003 |
| ... | ... | ... |

| USER ID | PASSWORD | FULL NAME | BIRTH DATE | GENDER | TERMINAL IP ADDRESS | MAIL ADDRESS | POSITION |
|---|---|---|---|---|---|---|---|
| 0001 | AA | AA | mm/dd, 19xx | M | 218.219.62.149 | aa@jp.a-company.com | A COMPANY EMPLOYEE |
| 0002 | BB | BB | mm/dd, 19xx | M | 66.249.69.15 | bb@jp.b-company.om | B COMPANY EMPLOYEE |
| 0003 | CC | CC | mm/dd, 19xx | F | 66.249.67.101 | cc@c-hos.or.jp | XX HOSPITAL DOCTOR |
| 0004 | DD | DD | mm/dd, 19xx | M | 218.219.62.148 | dd@jp.a-company.com | A COMPANY EMPLOYEE |
| 0005 | EE | EE | mm/dd, 19xx | F | 218.219.62.147 | ee@jp.a-company.com | A COMPANY EMPLOYEE |
| ... | ... | ... | ... | ... | ... | ... | ... |

| WORKPLACE | HOBBY | FAMILY | FRIENDS |
|---|---|---|---|
| A COMPANY XX BLDG. 7F | CLIMBING | 1110, 1120, 1130 | 0002, 8411, 9411 |
| B COMPANY YY LAB. 2F | WATCHING MOVIES | 1005, 1196, 2006 | 0001, 2164, 3005 |
| XX HOSPITAL D WARD | GARDENING | 6002 | 3915, 4268, 9615 |
| A COMPANY XX BLDG. 5F | CLIMBING | 3110, 3120 | 7411, 8411, 0001 |
| A COMPANY XX BLDG. 2F | CLIMBING | 4110 | 7411, 0001, 0002 |
| ... | ... | ... | ... |

FIG. 6

| GROUP ID | USER ID |
|---|---|
| 0001 | 0001 |
| 0001 | 0002 |
| 0001 | 0004 |
| 0001 | 0005 |
| 0002 | 0002 |
| 0002 | 0003 |
| ... | ... |

| DATA ID | GROUP ID |
|---------|----------|
| 0001 | 0001 |
| 0002 | 0001 |
| 0003 | 0003 |
| ... | ... |

| CONVERSION RULE ID | USER ID | METADATA NAME | CONVERSION RULE | SIGNIFICANT INFORMATION |
|---|---|---|---|---|
| 0001 | — | LOCATION | xx1 EAST LNG., yy1 NORTH LAT. THROUGH xx2 EAST LNG., yy2 NORTH LAT. | A COMPANY |
| 0002 | — | LOCATION | xx3 EAST LNG., yy3 NORTH LAT. THROUGH xx4 EAST LNG., yy4 NORTH LAT. | A'S HOUSE |
| 0003 | 0001 | CREATING DATE AND TIME | WEEKDAY 8:30 THROUGH 18:00 | A COMPANY WORKING HOURS |
| 0004 | 0002 | CREATING DATE AND TIME | WEEKDAY 9:00 THROUGH 17:30 | B COMPANY WORKING HOURS |
| ... | ... | ... | ... | ... |

| ESTIMATION RULE ID | CONDITIONS | ESTIMATION DISCLOSURE RANGE | DISCLOSURE DETERMINATION STANDARD |
|---|---|---|---|
| 0001 | A COMPANY | WITHIN A COMPANY | {email = ~a-company} |
| 0002 | A'S HOUSE | A'S FAMILY | {email = ~a-home} |
| 0003 | A'S HOUSE | A'S FRIENDS | {email = ~a-home} |
| 0004 | A COMPANY WORKING HOURS | WITHIN A COMPANY | {email = ~a-company} |
| ... | ... | ... | ... |

FIG. 18

| DATE | USER ID | FULL NAME | CATEGORY | CONTENTS | STARTING DATE AND TIME | EXPIRATION DATE AND TIME | PLACE | REGISTRATION DATE |
|---|---|---|---|---|---|---|---|---|
| MONTH-AND-DAY 1, 20XX | 0001 | AA | HOBBY | CLIMBING | 8:10 | 18:45 | MOUNT BLACKBURN | MONTH-AND-DAY 2, 20XX |
| MONTH-AND-DAY 1, 20XX | 0004 | DD | HOBBY | CLIMBING | 8:10 | 18:45 | MOUNT BLACKBURN | MONTH-AND-DAY 2, 20XX |
| MONTH-AND-DAY 1, 20XX | 0005 | EE | HOBBY | CLIMBING | 8:10 | 18:45 | MOUNT BLACKBURN | MONTH-AND-DAY 2, 20XX |
| MONTH-AND-DAY 1, 20XX | 0007 | GG | MEETING | PLANNING MEETING | ... | ... | SS COMPANY BLDG. 8F FIRST MEETING ROOM | ... |
| MONTH-AND-DAY 1, 20XX | 0008 | HH | BUSINESS TRIP | XX COMPANY VISITATION | ... | ... | XX COMPANY BLDG. 5F | ... |
| MONTH-AND-DAY 1, 20XX | 0009 | JJ | LEISURE | TRAVEL | ... | ... | NN CITY MM STATE | ... |
| ... | ... | ... | ... | ... | ... | ... | ... | ... |

| USER UD | DATE & TIME 1 | DATE & TIME 2 | LOCATION | CATEGORY | CONTENTS |
|---|---|---|---|---|---|
| 0001 | 8:10 ON SO-AND-SO MONTH-AND-DAY, 20XX | 18:45 ON SO-AND-SO MONTH-AND-DAY, 20XX | MOUNT BLACKBURN | HOBBY | CLIMBING |
| 0004 | 8:10 ON SO-AND-SO MONTH-AND-DAY, 20XX | 18:45 ON SO-AND-SO MONTH-AND-DAY, 20XX | MOUNT BLACKBURN | HOBBY | CLIMBING |
| 0005 | 9:30 ON SO-AND-SO MONTH-AND-DAY, 20XX | 16:15 ON SO-AND-SO MONTH-AND-DAY, 20XX | MOUNT WHITNEY | HOBBY | CLIMBING |
| ... | ... | ... | ... | ... | ... |

| CONVERSION RULE ID | USER ID | METADATA NAME | CONVERSION RULE | SIGNIFICANT INFORMATION |
|---|---|---|---|---|
| 2005 | 0001 | TIME | 8:10 THROUGH 18:45 ON SO-AND-SO MONTH-AND-DAY, 20XX | MOUNT BLACKBURN ON SO-AND-SO MONTH-AND-DAY, 20XX |
| 2006 | 0004 | TIME | 8:10 THROUGH 18:45 ON SO-AND-SO MONTH-AND-DAY, 20XX | MOUNT BLACKBURN ON SO-AND-SO MONTH-AND-DAY, 20XX |
| 2007 | 0005 | TIME | 9:30 THROUGH 16:15 ON SO-AND-SO MONTH-AND-DAY, 20XX | MOUNT WHITNEY ON SO-AND-SO MONTH-AND-DAY, 20XX |
| ... | ... | ... | ... | ... |

| POINT-IN-TIME INFORMATION | POSITION INFORMATION |
|---|---|
| 20XX/YY/ZZ-HH1/MM1/SS1 | EAST LNG. LE1 , NORTH LAT. NL1 |
| 20XX/YY/ZZ-HH2/MM2/SS2 | EAST LNG. LE2 , NORTH LAT. NL2 |
| 20XX/YY/ZZ-HH3/MM3/SS3 | EAST LNG. LE3 , NORTH LAT. NL3 |
| . . . | . . . |
| 20XX/YY/ZZ-HHx/MMx/SSx | EAST LNG. LEx , NORTH LAT. NLx |
| . . . | . . . |

| CONVERSION RULE | USER ID | METADATA NAME | CONVERSION RULE | SIGNIFICANT INFORMATION |
|---|---|---|---|---|
| 2005 | - | POSITION/TIME | xx1 EAST LNG., yy1 NORTH LAT., 20XX/YY/ZZ-h1/m1/s1 | 20XX/YY/ZZ MOUNT BLACKBURN |
| 2006 | - | POSITION/TIME | xx1 EAST LNG., yy1 NORTH LAT., 20XX/YY/ZZ-h2/m2/s2 | 20XX/YY/ZZ MOUNT BLACKBURN |
| 2007 | - | POSITION/TIME | xx1 EAST LNG., yy1 NORTH LAT., 20XX/YY/ZZ-h3/m3/s3 | 20XX/YY/ZZ MOUNT BLACKBURN |
| 2008 | - | POSITION/TIME | xx1 EAST LNG., yy1 NORTH LAT., 20XX/YY/ZZ-h4/m4/s4 | 20XX/YY/ZZ MOUNT BLACKBURN |
| 2009 | - | POSITION/TIME | xx1 EAST LNG., yy1 NORTH LAT., 20XX/YY/ZZ-h5/m5/s5 | 20XX/YY/ZZ MOUNT BLACKBURN |

80T

DISCLOSURE RANGE DETERMINATION METHOD, DISCLOSURE RANGE DETERMINATION APPARATUS, AND MEDIUM

CROSS-REFERENCE TO RELATED APPLICATION

This application is based upon and claims the benefit of priority of the prior Japanese Patent Application No. 2012-013329, filed on Jan. 25, 2012, the entire contents of which are incorporated herein by reference.

FIELD

The embodiments discussed herein are related to a disclosure range determination method, a disclosure range determination apparatus, and a medium to determine a disclosure range of data.

BACKGROUND

In the event of disclosing data via a network, the range of disclosure of the data is set by restricting a user who can access the data. Therefore, a user who discloses data specifies a disclosure range of data to be uploaded to a server device.

Japanese Laid-open Patent Publication Nos. 2009-26129 and 2002-176419 are examples of the related art of the present technology.

SUMMARY

According to an aspect of the invention, a disclosure range determination method that determines whether or not there is an error on a range in which data shared by a plurality of users is disclosed, the method including accepting a disclosure range of data and metadata of the data, extracting attribute information of a user that belongs to the disclosure range of the data accepted in the accepting based on association information associating a disclosure range of data with attribute information of a user that belongs to the disclosure range, converting the metadata accepted in the accepting into a keyword based on association information associating a conversion rule that converts the metadata into significant information with a keyword corresponding to the conversion rule, and determining, by a computer, whether or not a user that belongs to the disclosure range accepted in the accepting qualifies for the disclosure range accepted in the accepting, based on whether or not the keyword converted in the converting is included in the attribute information extracted in the extracting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram indicating an example of the record layout of a group table;

FIG. 5 is an explanatory diagram indicating an example of the record layout of a user table;

FIG. 6 is an explanatory diagram indicating an example of the record layout of a group member related table;

FIG. 7 is an explanatory diagram indicating an example of the record layout of a disclosed data group related table;

FIG. 9 is an explanatory diagram indicating an example of the record layout of a conversion rule table;

FIG. 10 is an explanatory diagram indicating an example of the record layout of an estimation rule table;

FIG. 18 is an explanatory diagram indicating an example of the record layout of a schedule table;

FIG. 19 is an explanatory diagram indicating an example of the record layout of an action history table;

FIG. 20 is an explanatory diagram indicating an example of the record layout of a conversion rule table;

FIG. 24 is an explanatory diagram illustrating an example of a record layout of the action history table.

FIG. 25 is an explanatory diagram illustrating an example of a record layout of the conversion rule table.

DESCRIPTION OF EMBODIMENTS

According to conventional arts, a user who has specified a disclosure range of data may be uncertain regarding whether or not the user has made an error with respect to the specified disclosure range, whether or not a member regarding which disclosure of data is undesirable is included in the specified disclosure range, or the like.

A data disclosure system according to the present embodiment will be described based on drawings thereof. The data disclosure system is a membership system, for example. A user logs into a server device in which data is registered using authentication employing, for example, a user ID or password to perform browsing or downloading of data. However, not all of the users may access registered data. A user alone belonging to a group specified by a user who uploaded data to a server device may access this data to share this data. That is to say, with the data disclosure system, a group specified by a user who uploaded data is set as a disclosure range of the data.

Data that the data disclosure system takes as an object includes still image data, moving image data, audio data, document data (text file, MS Office (registered trademark), document, etc.), presentation data, and so forth, for example. Hereafter, still image data that is an example of content data will be taken as data that the data disclosure system takes as an object. Note that Data that the data disclosure system takes as an object may include program source code, object code, experimental data, survey data, design data, accounting data, medical data, production control data, and so forth.

Note that the present technology is not restricted to the following embodiments.

First Embodiment

Figure 1:
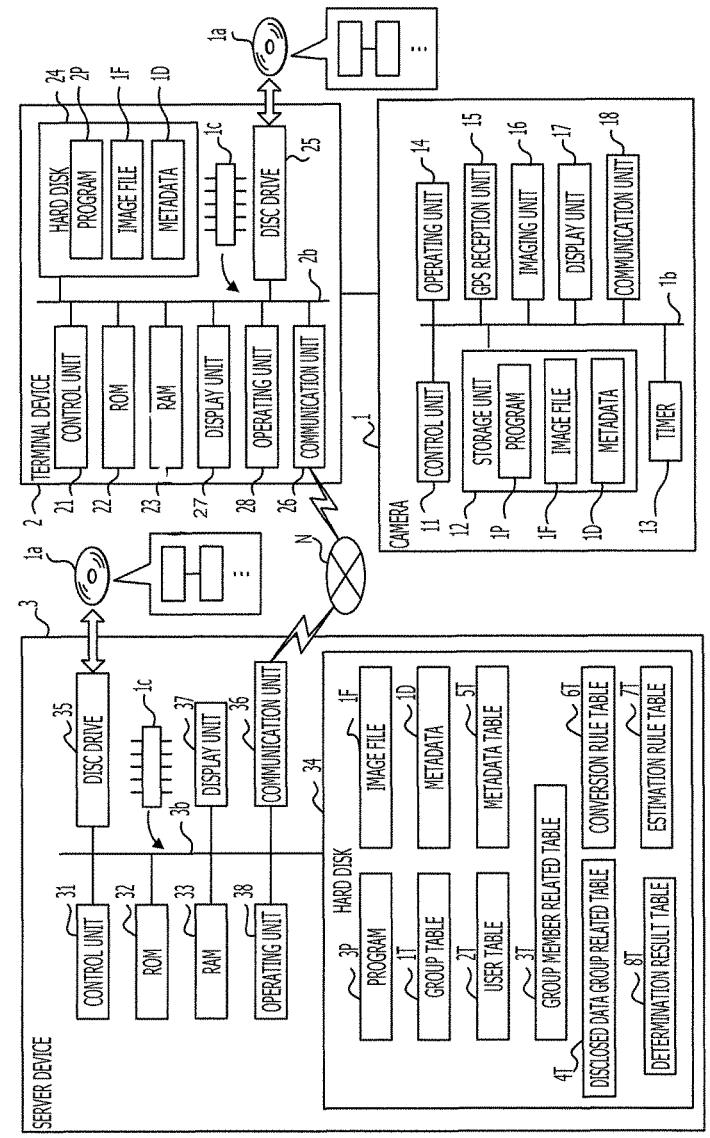
FIG. 1 is a block diagram illustrating a hardware configuration example of a data disclosure system.

FIG. 1 is a block diagram illustrating a hardware configuration example of a data disclosure system. The data disclosure system includes a camera 1, a terminal device 2, and a server device (disclosure range determination device, computer) 3. The camera 1 and terminal device 2 are connected by wired or wireless. The terminal device 2 and server device 3 are connected via a network N, and may mutually perform transmission/reception of information. Note that the network N includes a LAN (Local Area Network), a WAN (Wide Area Network), the Internet, a telephone communication line network, a satellite communication line network, and so forth.

The camera 1 includes a control unit 11, a storage unit 12, a timer 13, an operating unit 14, a GPS (Global Positioning System) reception unit 15, an imaging unit 16, a display unit 17, and a communication unit 18. The hardware components of the camera 1 are mutually connected via a bus 1b.

The control unit 11 is a processor such as a CPU (Central Processing Unit) or MPU (Micro Processor Unit) or the like which controls the components of the camera 1. The control unit 11 executes various types of processing in accordance with a program 1P stored beforehand in the storage unit 12.

The storage unit 12 is readable and writable nonvolatile semiconductor memory, for example. The storage unit 12 stores an image file 1F of a still image (hereafter, referred to as image) imaged by the camera 1, and metadata 1D thereof. Also, various types of information relating to the program 1P and camera 1 that the control unit 11 executes are stored in the storage unit 12. The program 1P includes a positioning program relating to GPS. The various types of information relating to the camera 1 include identification information of a user which is an owner of the camera 1. The identification information of the user mentioned here is a user ID and a password arranged to log into the server device 3 of the data disclosure system, for example.

The timer 13 transmits counted date and time to the control unit 11.

The operating unit 14 is a button (e.g., shutter button) group for the user operating the camera 1. The operating unit 14 transmits, in the event that each button has been operated by the user, an operation signal corresponding to the operated button to the control unit 11.

The GPS reception unit 15 includes an antenna (not illustrated in the drawing) configured to receive radio waves that a GPS satellite transmitted, and receives radio waves from a GPS satellite via this antenna. The GPS reception unit 15 converts the received radio waves into electrical signals, and transmits the converted electrical signals to the control unit 11. The control unit 11 obtains latitude, longitude, and altitude as position information of the camera 1 by executing the positioning program stored in the storage unit 12 based on the electrical signals received from the GPS reception unit 15. The formats of latitude, longitude, and altitude are formats conforming to NMEA (National Marine Electronics Association) 0183 standard, for example.

The imaging unit 16 includes a lens, a shutter, a flash, and a CCD imaging device. The imaging unit 16 obtains analog image signals by subjecting optical signals input from the lens to photoelectric conversion using the CCD imaging device. The imaging unit 16 converts, under control by the control unit 11, the obtained analog image signals into digital signals, subjects to signal processing and image processing, and then outputs to the control unit 11. The control unit 11 stores the image signal from the imaging unit 16 in the storage unit 12 as the digital image file 1F. At this time, the control unit 11 stores date and time received from the timer 13, latitude, longitude, and altitude based on the GPS reception unit 15, and the identification information of a user in the storage unit 12 in a manner correlated with the image file 1F as the metadata 1D of the image file 1F.

The display unit 17 is a liquid crystal panel where multiple liquid crystal elements are arrayed in a two-dimensional matrix fashion. The display unit 17 displays operation situations of the camera 1, notification information to a user, an image imaged by the imaging unit 16, and so forth. Note that a touch operation function as to a touch panel may be substituted for a portion or all of functions that the button group of the operating unit 14 has by employing a touch-panel-type liquid crystal panel as the display unit 17.

The communication unit 18 is a wired or wireless communication modem, a LAN card, a USB (Universal Serial Bus) terminal, or the like. The camera 1 may perform transmission/reception of information as to the terminal device 2. At this time, the communication unit 18 may be connected to the terminal device 2 via the network N, or may be connected to the terminal device 2 not via the network N. Also, the communication unit 18 may also be connected to the server device 3 via the network N.

The communication unit 18 may also be connected to the network N via a wireless LAN access point. In the event that the GPS reception unit 15 is in an environment where it is difficult to receive radio waves from a GPS satellite (e.g., in a room, a metropolitan environment where tall buildings stand in a row, etc.), the control unit 11 may substitute identification information of a wireless LAN access point for position information to be correlated with the image file 1F. Examples of the identification information of a wireless LAN access point include an ESSID, and MAC (Media Access Control) address.

The communication unit 18 may also have a communication function of a cellular phone. Therefore, the camera 1 may transmit/receive information to/from the server device 3 via a base station for the cellular phone, and a telephone communication line network.

The server device 3 may determine the position of the camera 1 based on the position information of the base station of the cellular phone. Therefore, the server device 3 may append the determined position of the camera 1 to the metadata 1D of the image file 1F.

The camera 1 transmits the image file 1F and metadata 1D stored in the storage unit 12 to the terminal device 2.

Note that the camera 1 may also store the generated image file 1F and metadata 1D in semiconductor memory 1c such as flash memory or the like via a USB terminal of the communication unit 18.

The terminal device 2 includes a PC (personal computer), a notebook PC, a cellular phone, a smart phone, a PHS (Personal Handyphone System) terminal, a PDA (Personal Digital Assistant), a tablet PC, a game machine, or the like. Hereafter, description will be made with a PC as an example of the terminal device 2.

The terminal device 2 includes a control unit 21, ROM (Read Only Memory) 22, RAM (Random Access Memory) 23, a hard disk 24, a disc drive 25, a communication unit 26, a display unit 27, and an operating unit 28. The hardware components of the terminal device 2 are mutually connected via a bus 2b.

The control unit 21 is a processor such as a CPU, MPU, or the like, and controls the components of the terminal device 2. The control unit 21 reads out a program 2P stored in the hard disk 24 to the RAM 23, and executes the read program 2P.

The ROM 22 is a nonvolatile semiconductor memory or a read-only storage medium other than a semiconductor memory, for example. The ROM 22 stores a BIOS (Basic Input/Output System), firmware, or the like that the control unit 21 executes at the time of activating the terminal device 2.

The RAM 23 is, for example, SRAM (Static RAM) or DRAM (Dynamic RAM), and temporarily stores a working variable, data, and so forth which are used for a process of processing that the control unit 21 executes. Note that the RAM 23 is an example of a main storage device, and flash memory, a memory card, or the like may be employed instead of the RAM 23.

The hard disk 24 stores the program 2P that the control unit 21 executes. Also, the hard disk 24 stores the image file 1F and metadata 1D transmitted from the camera 1.

Note that the hard disk 24 may be a device to be attached within the terminal device 2, or may be a device to be disposed outside of the terminal device 1. The hard disk 24 is an example of an auxiliary storage device, and may be substituted by an optical disc capable of recording great amounts of information, 1a such as flash memory, CD (Compact Disc), DVD (Digital Versatile Disk), BD (Blu-ray Disc (registered trademark)), or the like.

The disc drive 25 reads out information from the optical disc 1a such as CD, DVD, BD, or the like which is an external recording medium, and records the information in the optical disc 1a. The control unit 21 discharges, in the event of having accepted a discharge command of the optical disc 1a as to the disc drive 25 from the operating unit 28, a tray which is not illustrated of the disc drive 25.

The communication unit 26 is a wired or wireless communication modem, a LAN card, a USB terminal, or the like. The terminal device 2 is connected to the camera 1 via the communication unit 26. Note that the terminal device 2 may also obtain the image file 1F and metadata 1D from the semiconductor memory 1c such as flash memory or the like in which the image file 1F and metadata 1D generated by the camera 1 are stored, via the USB terminal of the communication unit 16.

The communication unit 26 is connected to the server device 3 via the network N.

The display unit 27 includes a screen, for example, such as a liquid crystal display, organic EL (Electro-Luminescence) display, CRT (Cathode Ray Tube) display, or the like, and displays various types of information relating to the program 2P in accordance with instructions from the control unit 21.

The operating unit 28 includes an input device such as a keyboard or mouse for the user performing various types of input, a power supply switch, an operation button configured to discharge the optical disc 1a from the disc drive 25, and so forth. The operating unit 28 generates an input signal based on operations by the user. The generated input signal is transmitted to the control unit 21 via the bus 2b.

The server device 3 includes a PC, workstation, general-purpose computer, or the like. Hereafter, description will be made with reference to a workstation as an example of the server device 3.

The server device 3 has various functions of a database server on which a database engine is mounted, a DNS (Domain Name Server), a WEB (World Wide Web) server, an application server, and a mail server. It goes without saying that a system may be constructed wherein these functions are distributed to multiple machines according to the specifications of the server device 3.

The server device 3 includes a control unit 31, ROM 32, RAM 33, a hard disk 34, a disc drive 35, a communication unit 36, a display unit 37, and an operating unit 38. The hardware components of the server device 3 are mutually connected via a bus 3b.

The control unit 31 is a processor such as a CPU or the like, and controlsthe components of the server device 3. The control unit 31 reads out a program 3P recorded in the hard disk 34 to the RAM 33, and executes the read program 3P.

The ROM 32 is a nonvolatile semiconductor memory or a read-only storage medium other than a semiconductor memory, for example. The ROM 32 stores a BIOS, firmware, or the like that the control unit 31 executes at the time of activating the server device 3.

The RAM 33 is, for example, SRAM or DRAM, and temporarily stores a working variable, data, and so forth which are used for a process of processing that the control unit 31 executes. Also, the RAM 33 may temporarily store an execution result of viewing, for example. Note that the RAM 33 is an example of the main storage device, and flash memory, a memory card, or the like may be employed instead of the RAM 33.

The hard disk 34 stores the image file 1F and metadata 1D transmitted from the terminal device 2. The hard disk 34 stores the program 3P that the control unit 31 executes, and various tables.

The various tables include a group table 1T, a user table 2T, a group member relation table 3T, a disclosed data group relation table 4T, and a metadata table 5T. The group table 1T is a table arranged to manage a group that is a disclosure range of data. The user table 2T is a table arranged to manage the attribute of a user who employs the data disclosure system according to the present embodiment.

The group member relation table 3T is a table arranged to manage a group that is a disclosure range of data and a member belonging to this group in a correlated manner. The member mentioned here also serves as a user who employs the data disclosure system. The disclosed data group relation table 4T is a table arranged to manage data to be disclosed and a group that is a disclosure range in a correlated manner. The metadata table 5T is a table arranged to manage the metadata 1D of data to be disclosed.

The various tables include a conversion rule table 6T, an estimation rule table 7T, and a determination result table 8T. The conversion rule table 6T is a table arranged to convert the metadata 1D of data to be disclosed into significant information. The significant information mentioned here is information meaningful to users. For example, even when coordinates themselves of latitude and longitude that are an example of metadata are meaningless to users, in the event that a geographic name, organization name, or facility name corresponding to the latitude and longitude thereof is meaningful to users, the organization name or the like thereof becomes significant information. For example, even when data creation date and time itself that is an example of metadata is meaningless to users, in the event that time corresponding to the creating date and time thereof is a user's working hours, commuting hours, free time, or the like, a text string of working hours or the like becomes significant information. The text string of working hours or the like corresponds to a user's action classification or action contents at the creating date and time thereof.

The estimation rule table 7T is a table arranged to convert significant information into a determination standard arranged to determine whether or not a user of a specified disclosure group is included in a disclosure range estimated beforehand from this significant information or a combination of logical operations of significant information. For example, in the event that significant information is an organization name, the determination standard includes the name, abbreviated name, trademark, common name, and so forth of the organization thereof. For example, in the event that significant information is working hours of an organization to which the user belongs, the determination standard includes the name, abbreviated name, trademark, common name, and so forth of the organization to which the user belongs.

The determination result table 8T is a table in which a determination result regarding whether or not the server device 3 qualifies as a member belonging to the disclosure range is written.

Note that the hard disk 34 may be attached to the inside of the server device 3, or may be disposed outside of the server device 3. The hard disk 34 is an example of an auxiliary storage device, and may be substituted by flash memory capable of recording of large capacity volume, or the optical disc 1a such as CD, DVD, BD, or the like.

The disc drive 35 reads out information from the optical disc 1a such as CD, DVD, BD, or the like which is an external recording medium, and records the information in the optical disc 1a. The control unit 31 discharges, in the event of having accepted a discharge command of the optical disc 1a as to the disc drive 35 from the operating unit 38, a tray which is not illustrated of the disc drive 35.

The communication unit 36 is a wired or wireless communication modem, a LAN card, a USB terminal, or the like, and is connected to the network N. The communication unit 36 is connected to the terminal device 2 via the network N. Also, the communication unit 36 may be connected to the camera 1 via the network N.

The display unit 37 includes a screen, for example, such as a liquid crystal display, organic EL display, CRT display, or the like, and displays various types of information relating to the program 3P in accordance with instructions from the control unit 31.

The operating unit 38 includes an input device such as a keyboard or mouse for the user performing various types of input, a power supply switch, an operation button configured to discharge the optical disc 1a from the disc drive 35, and so forth. The operating unit 38 generates an input signal based on operations by the user. The generated input signal is transmitted to the control unit 31 via the bus 3b.

Next, an example of function outline of the data disclosure system will be described.

Figure 2:
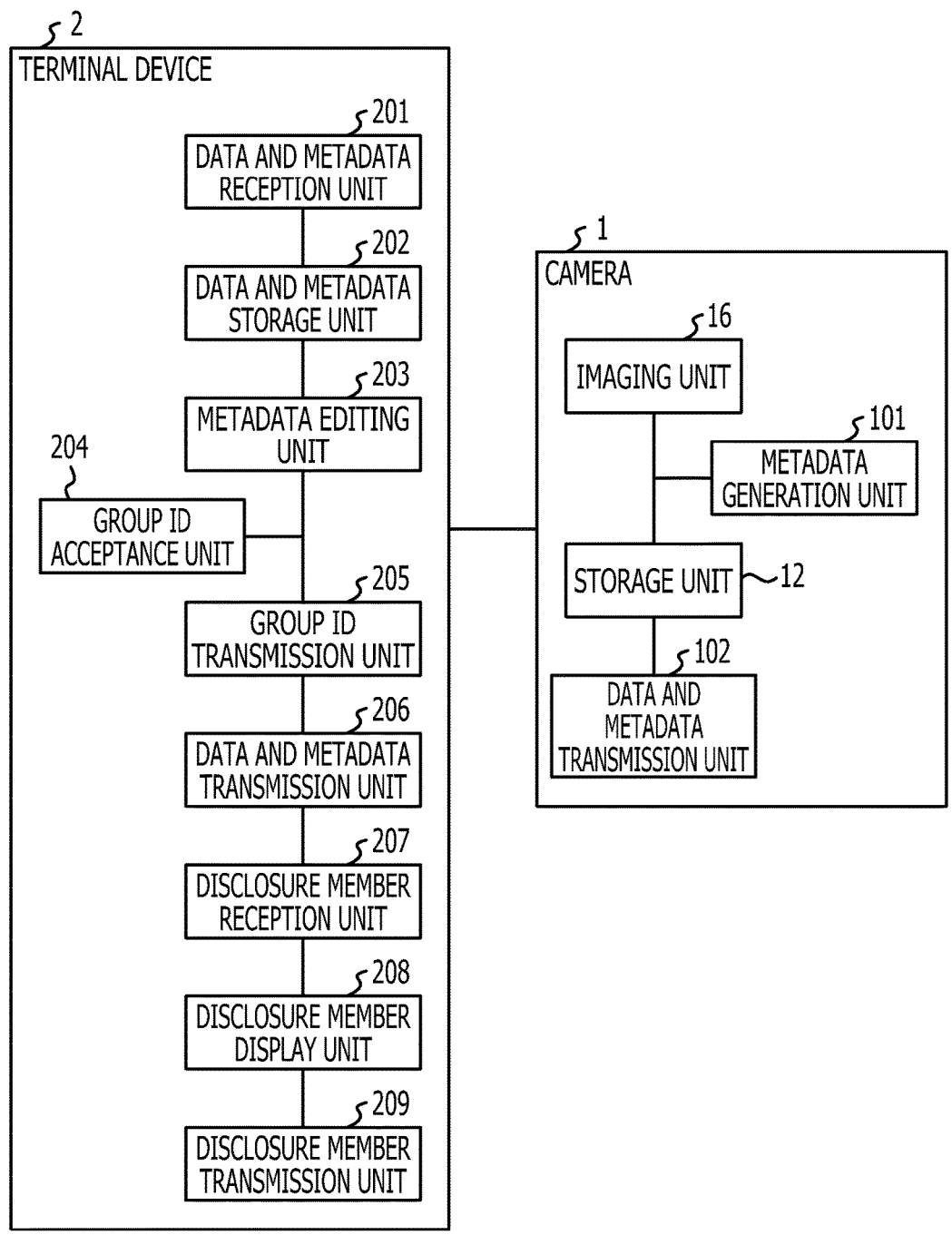
FIG. 2 is a function block diagram illustrating a function configuration example of the data disclosure system.
Figure 3:
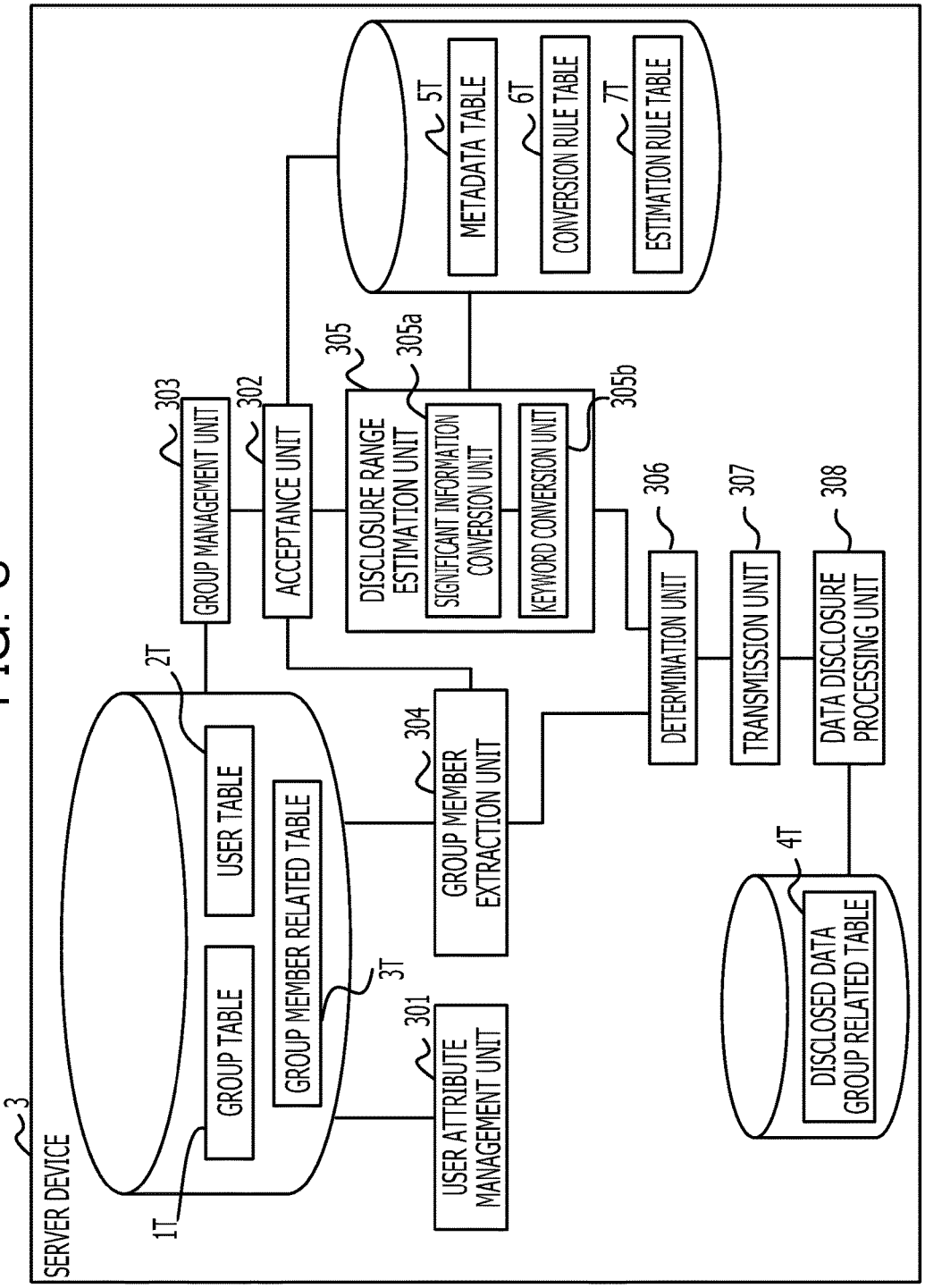
FIG. 3 is a function block diagram illustrating a function configuration example of the data disclosure system.

FIGS. 2 and 3 are function block diagrams illustrating a function configuration example of the data disclosure system. FIG. 2 illustrates an example of functions that each of the camera 1 and terminal device 2 has. FIG. 3 illustrates an example of functions that the server device 3 has.

The functional units relating to the camera 1 in FIG. 2 function by the control unit 11 operating based on the program 1P stored in the storage unit 12. The functional units relating to the terminal device 2 in FIG. 2 function by the control unit 21 operating based on the program 2P stored in the hard disk 24. The functional units relating to the server device 3 in FIG. 3 function by the control unit 31 operating based on the program 3P stored in the hard disk 34.

The camera 1 includes an imaging unit 16, a metadata generation unit 101, a storage unit 12, and data and metadata transmission unit 102. The imaging unit 16 images an image based on externally captured light to generate the digital image file 1F. The metadata generation unit 101 generates date and time accepted from the timer 13, a position based on radio waves received by the GPS reception unit 15, and a user ID stored in the storage unit 12 as the metadata 1D relating to imaging. The storage unit 12 stores the image file 1F generated by the imaging unit 16. The storage unit 12 stores the metadata 1D generated by the metadata generation unit 101. The data and metadata transmission unit 102 transmits the image file 1F and metadata 1D stored in the storage unit 12 to the terminal device 2.

The terminal device 2 includes the data and metadata reception unit 201 and a data and metadata storage unit 202. The data and metadata reception unit 201 receives the image file 1F and metadata 1D transmitted from the data and metadata transmission unit 102 of the camera 1. The data and metadata storage unit 202 stores the image file 1F and metadata 1D that the data and metadata reception unit 201 received from the camera 1 in the hard disk 24.

The terminal device 2 includes a metadata editing unit 203. The metadata editing unit 203 displays an editing screen (not illustrated in the drawing) arranged to edit the metadata 1D generated by the metadata generation unit 101 of the camera 1, on the display unit 27. This editing screen includes a part whereby the metadata 1D generated by the metadata generation unit 101 may be changed, and a part to which another metadata 1D to be added to the metadata 1D generated by the metadata generation unit 101 is input.

The metadata editing unit 203 edits, based on input data from the operating unit 28, part or all of the metadata 1D generated by the metadata generation unit 101. Also, the metadata editing unit 203 generates, based on input data from the operating unit 28, another metadata 1D different from the metadata 1D generated by the metadata generation unit 101. The metadata editing unit 203 adds the generated other metadata 1D to the metadata 1D generated by the metadata generation unit 101, or the metadata 1D after editing. The other metadata 1D that the metadata editing unit 203 adds mentioned here includes a title, remarks, and so forth regarding an image of the image file 1F that the user input from the operating unit 28.

The data and metadata storage unit 202 stores, in the event that the metadata 1D has been edited or added by the metadata editing unit 203, the metadata 1D after updating in the hard disk 24.

Note that, in the event that the user has not edited the metadata 1D via the operating unit 28, and also new another metadata 1D has not been added to the metadata 1D generated by the metadata generation unit 101, the metadata editing unit 203 may be omitted.

The terminal device 2 includes a group ID acceptance unit 204, a group ID transmission unit 205, and a data and metadata transmission unit 206. The group ID acceptance unit 204 accepts, from the operating unit 28, identification information of a group corresponding to a disclosure range of data to be disclosed by the user. The group ID transmission unit 205 transmits the identification information of the group accepted by the group ID acceptance unit 204 to the server device 3. The data and metadata transmission unit 206 transmits the metadata 1D and image file 1F that the data and metadata storage unit 202 stored in the hard disk 24, to the server device 3.

Note that the data and metadata transmission unit 206 may consecutively transmit the image file 1F and metadata 1D to the server device 3, or may separately transmit the image file 1F and metadata 1D to the server device 3 at different timing. Also, the identification information of the group and the image file 1F and metadata 1D may consecutively be transmitted to the server device 3 or may separately be transmitted to the server device 3 at different timing by the group ID transmission unit 205 and data and metadata transmission unit 206 collaborating.

The terminal device 2 includes a disclosure member reception unit 207, a disclosure member display unit 208, and a disclosure member transmission unit 209. In the event that the group ID transmission unit 206 has transmitted the identification information of the group to the server device 3, and the data and metadata unit 206 has transmitted at least the meta data 1D to the server device 3, the disclosure member reception unit 207 executes the next processing. The disclosure member reception unit 207 receives a disclosure member list screen including qualified/disqualified classification as a disclosure range of data from the server device 3. The disclosure member display unit 208 displays the disclosure member list screen received by the disclosure member reception unit 207 on the display unit 27. In the event of changing a disclosure member based on the disclosure member list screen, the user edits a disclosure member from a disclosure member editing screen (not illustrated in the drawing). In the event that the user has edited a disclosure member, the disclosure member transmission unit 209 transmits member information belonging to a disclosure range after editing to the server device 3.

The server device 3 includes a user attribute management unit 301, an acceptance unit 302, and a group management unit 303. The user attribute management unit 301 executes registration of a new record, deletion processing, and updating processing as to the user table 2T. For example, the user attribute management unit 301 executes, based on data relating to a user that the system administrator has input from the operating unit 38 to a user management screen (not illustrated in the drawing) displayed on the display unit 37, a query against the user table 2T.

Note that the user attribute management unit 301 may obtain data to execute a query against the user table 2T from the terminal device 2.

The acceptance unit 302 accepts member information of a group corresponding to a disclosure range of data from the terminal device 2 beforehand. The acceptance unit 302 also accepts, in the event that the user has changed a disclosure member, member information of a group corresponding to the disclosure range from the terminal device 2. The acceptance unit 302 outputs the member information of the group corresponding to the accepted disclosure range to the group management unit 303.

The acceptance unit 302 accepts identification information of a group, image file 1F, and metadata 1D from the terminal device 2. The acceptance unit 302 outputs the identification information of the accepted group to the group member extraction unit 304. The acceptance unit 302 registers the accepted metadata 1D in the metadata table 5T.

The group management unit 303 registers, based on the group member information accepted by the acceptance unit 302, the record of a new group in the group table 1T. The group management unit 303 registers, based on the group member information accepted by the acceptance unit 302, a new group, and members belonging to the group thereof in the group member related table 3T. The members mentioned here also serve as users registered in the user table 2T. Also, in the event that the user changes a disclosure member, the group management unit 303 updates the group member related table 3T based on the group member information accepted by the acceptance unit 302.

The server device 3 includes a group member extraction unit 304, a disclosure range estimation unit 305, and a determination unit 306. The group member extraction unit 304 obtains the group identification information from the acceptance unit 302. The group member extraction unit 304 references, based on the obtained group identification information, the group member related table 3T and user table 2T to extract attribute information of a member belonging to the disclosure range specified by the user who will disclose data. The group member extraction unit 304 outputs the extracted member attribute information to the determination unit 306. Note that the attribute information of a member includes the identification information of the member.

The disclosure range estimation unit 305 includes a significant information conversion unit 305a and a keyword conversion unit 305b. The significant information conversion unit 305a reads out the metadata 1D stored in the metadata table 5T, and converts the read metadata 1D into significant information with reference to the conversion rule table 6T. The keyword conversion unit 305b converts the significant information converted by the significant information conversion unit 305a into a determination standard corresponding to a pre-estimated disclosure range with reference to the estimation rule table 7T. The keyword conversion unit 305b outputs the converted determination standard to the determination unit 306.

Note that the disclosure range estimation unit 305 may obtain the metadata 1D by accepting the metadata 1D from the acceptance unit 302 without obtaining the metadata 1D from the metadata table 5T.

Also, though the disclosure range estimation unit 305 includes two functional units of the significant information conversion unit 305a and keyword conversion unit 305b, the metadata 1D may directly be converted into a determination standard corresponding to the pre-estimated disclosure range with reference to the conversion rule table 6T and estimation rule table 7T as a combination thereof. In such a case, the disclosure range estimation unit 305 is summarized into one functional unit.

The determination unit 306 accepts attribute information of a member belonging to a disclosure range specified by a user who discloses data from the group member extraction unit 304. Also, the determination unit 306 accepts a keyword relating to an estimated disclosure range from the keyword conversion unit 305b. The determination unit 306 searches for a keyword from the attribute information of a member regarding each of the members accepted from the group member extraction unit 304. The determination unit 306 determines based on this search whether or not a member qualifies for the disclosure range. The determination unit 306 creates a list including the determination result regarding each of the members accepted from the group member extraction unit 304.

The server device 3 includes a transmission unit 307 and a data disclosure processing unit 308. The transmission unit 307 accepts a disclosure member list including the determination result from the determination unit 306. The transmission unit 307 generates a screen in which this list is included, and transmits the generated screen to the terminal device 2.

Based on the determination result by the determination unit 306, in the event that all of the members that the group member extraction unit 304 extracted qualify for the disclosure range, the data disclosure processing unit 308 accepts confirmation information of the disclosure range from the terminal device 2. The data disclosure processing unit 308 sets all of the members as the disclosure range of data based on the accepted disclosure range confirmation information. On the other hand, based on the determination result by the determination unit 306, in the event that there is a member disqualified to the disclosure range of the members extracted by the group member extraction unit 304, the data disclosure processing unit 308 accepts change data of the disclosure range from the terminal device 2. The data disclosure processing unit 308 determines a member belonging to the disclosure range of data based on the accepted change data of the disclosure range, and sets the determined member in the disclosure range of data. Also, the data disclosure processing unit 308 registers the data to be disclosed and the set disclosure range in the disclosed data group related table 4T in a correlated manner. The data disclosure processing unit 308 transmits a mail wherein a URL (Uniform Resource Locator) accessible to the data is described to a mail address of a member included in the disclosure range.

Next, description will be made regarding details of the various tables stored in the hard disk 34 of the server device 3.

FIG. 4 is an explanatory diagram indicating an example of the record layout of the group table 1T. The group table 1T includes the columns of group ID, group name, and user ID. The group ID is a symbol arranged to identify a group to disclose data. The group name is the name of a group corresponding to a group ID. The user ID is a symbol arranged to identify a user with a group to disclose data being registered.

FIG. 5 is an explanatory diagram indicating an example of the record layout of the user table 2T. The user table 2T is a table arranged to manage the attribute of a user who employs the data disclosure system.

The user table 2T includes of the columns of user ID, password, full name, birth date, and gender. The user ID is a symbol arranged to identify a user who employs the data disclosure system. The user IDs of the user table 2T are the same as the user IDs of the group table 1T. The password is a symbol arranged to identify a user who employs the data disclosure system. The user ID and password are personal information to be used in the event that the server device 3 executes authentication processing for users. The birth date is a user's birth date, and a format thereof is a "month day, year" format. The gender is a user's gender.

The user table 2T includes the columns of terminal IP (Internet Protocol) address, mail address, position, and workplace. The terminal IP address is the identification information of the terminal device 2 which a user uses on the network N. The mail address is a mail address which a user obtained. The position is a user's organization and post. The workplace is the name of a building where a user's organization exists, and may include floor information. Note that the position may include the identification information of a user's room and a user's department.

The user table 2T includes the columns of hobby, family, and friends. The hobby is a user's hobby. The family is an array of user IDs corresponding to a user's family members, which is delimited with a comma. The friends is an array of user IDs corresponding to a user's friends, which is delimited with a comma.

FIG. 6 is an explanatory diagram indicating an example of the record layout of the group member related table 3T. The group member related table 3T is a table arranged to define the organization of a member belonging to a group that is a disclosed rage of data.

The group member related table 3T includes the columns of group ID and user ID. The group ID is the same as the group ID of the group table 1T. The user ID is the same as the user ID of the user table 2T.

FIG. 7 is an explanatory diagram indicating an example of the record layout of the disclosed data group related table 4T. The disclosed data group related table 4T is a table arranged to manage data to be disclosed and a group that is a disclosure range in a correlated manner.

The disclosed data group related table 4T includes the columns of data ID and group ID. The data ID is a symbol arranged to identify data to be disclosed. The group ID is the same as the group ID of the group table 1T.

Figure 8:
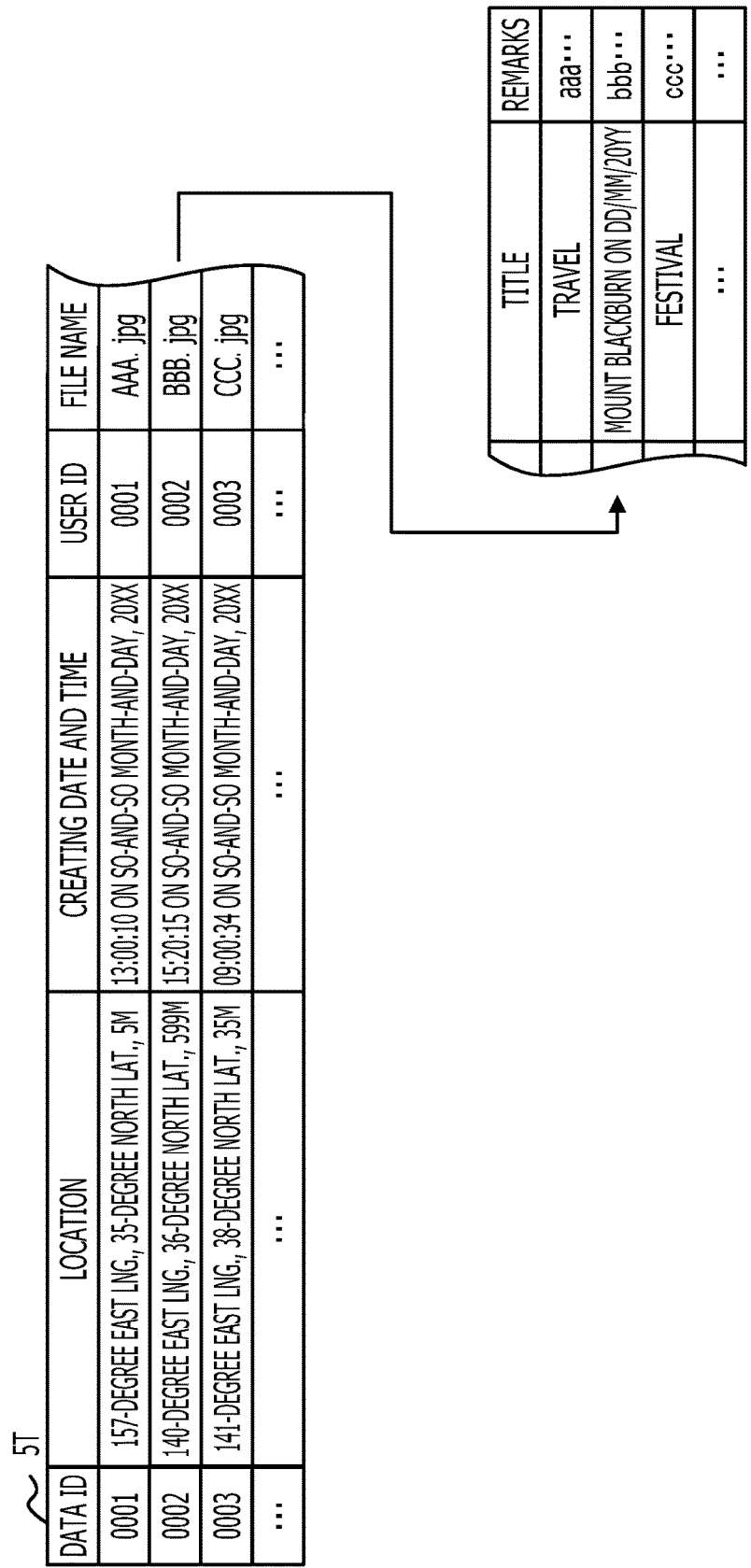
FIG. 8 is an explanatory diagram indicating an example of the record layout of a metadata table.

FIG. 8 is an explanatory diagram indicating an example of the record layout of the metadata table 5T. The metadata table 5T is a table arranged to manage the metadata ID of data to be disclosed.

The metadata table 5T includes the columns of data ID, location, creating date and time, user ID, and file name. The data ID is the same as the data ID of the disclosed data group related table 4T. The location is the coordinates of latitude and longitude, and altitude which indicate a position where data was created. The creating date and time is date and time when data was created, and a format thereof is, for example, "hour : minute on month day, year" format. The user ID is the same as the user ID of the user table 2T. The file name is the file name of data to be disclosed.

The metadata table 5T includes the columns of title and remarks. The title is the title or heading of data. The remarks are interpretation, opinion, or comment of a data creator as to the data. The title and remarks of the metadata table 5T are the metadata 1D that the user added to the metadata 1D generated by the camera 1 from the operating unit 28 of the terminal device 2. Accordingly, in the event that the user has not added the metadata 1D to the metadata 1D generated by the camera 1, the title and remarks of the metadata table 5T are still blanks.

FIG. 9 is an explanatory diagram indicating an example of the record layout of the conversion rule table 6T. The conversion rule table 6T is a table arranged to manage a conversion rule arranged to convert the metadata 1D into significant information and this significant information in a correlated manner.

The conversion rule table 6T includes the columns of conversion rule ID, user ID, and metadata name. The conversion rule 1D is a symbol arranged to identify a conversion rule. The user ID is the same as the user ID of the user table 2T. The metadata name is any column name of the metadata table 5T. With the example in FIG. 9, in the event of the record of conversion rule ID=0001, this indicates that the metadata 1D to be applied to the conversion rule is the location. Also, with the example in FIG. 9, in the event of the record of conversion rule ID=0003, this indicates that the metadata 1D to be applied to the conversion rule is the creating date and time.

The conversion rule table 6T includes the columns of conversion rule and significant information. The conversion rule is a rule to convert metadata into significant information. The significant information is meaningful information after converting the metadata 1D in accordance with the conversion rule.

With the example in FIG. 9, in the event of the record of conversion rule ID=0001, the conversion rule corresponding to the location is a certain location range indicated with latitude and longitude. For example, in the event that latitude and longitude indicating the position of the metadata 1D is included in the location range of the conversion rule, the location of this metadata 1D is converted into a particular organization name called A company.

With the example in FIG. 9, in the event of the record of conversion rule ID=0003, the conversion rule corresponding to the creating date and time is a certain time range on weekday. For example, in the event that time indicating the creating date and time of the metadata 1D is included in the time range of the conversion rule, the creating date and time of this metadata 1D is converted into the working hours of a particular organization called A company working hours.

In the event of converting the creating date and time of the metadata 1D into working hours, the working hours differ for each user, and accordingly, the column of user ID is provided to the conversion rule table 6T. In the event of converting the location of the metadata 1D into significant information such as organization, facility, geographical name, or the like, it is assumed that the significant information after conversion is the same for any user, and for example, in the event of a record where the metadata name in FIG. 9 is the location, the user ID is still a blank.

Note that the position of the metadata 1D may be converted into different significant information for each user. In such a case, with a record of the conversion rule table 6T where the metadata name is the location, a value is input to the user ID column. That is to say, whether or not the metadata is converted into different significant information for each user depends on the conversion rule. In the event of stipulating a different conversion rule for each user, the user IDs of the conversion rule table 6T are employed, and in the event of stipulating the same conversion rule for any user, the user IDs of the conversion rule 6T are not employed.

The conversion rule table 6T is managed via a conversion rule management screen (not illustrated in the drawing) to be displayed on the display unit 27 of the terminal device 2 or the display unit 37 of the server device 3. With the above description, of the location information of the metadata 1D, altitude is not employed. However, for example, in the event that a certain location range indicated with latitude and longitude and an altitude range have been registered in the conversion rule of the conversion rule table 6T, significant information based on latitude and longitude and altitude may be registered in the conversion rule table 6T.

FIG. 10 is an explanatory diagram indicating an example of the record layout of the estimation rule table 7T. The estimation rule table 7T is a table arranged to manage a disclosure range estimated based on significant information, and a determination standard arranged to determine whether or not a member of the specified disclosure range qualifies for a member of the estimated disclosure range, in a correlated manner.

The estimation rule table 7T includes the columns of estimation rule ID, conditions, estimated disclosure range, and disclosure determination standard. The estimation rule ID is a symbol arranged to identify an estimation rule arranged to estimate a disclosure range based on significant information. The conditions are the same as the significant information of the conversion rule table 6T, or a combination with logical computations of significant information. The estimated disclosure range is a disclosure range estimated based on the conditions beforehand. The disclosure determination standard is a text string arranged to provide a determination standard arranged to determine whether or not a member of a disclosure group qualifies for a member of the estimated disclosure range, and is, for example, a text string arranged to be determined in view of the attribute of a member included in the estimated disclosure range.

The estimation rules in the estimation rule table 7T are a combination of the conditions, estimated disclosure range, and disclosure determination standard.

The disclosure determination standard is a text string arranged to be determined by the server device 3 regarding whether to be included in the attribute of a user belonging to a group that is the disclosure range specified by a user who discloses data.

For example, if we say that the disclosure determination standard is {email=a-company}, when a text string called a-company is included in a mail address of the user table 2T, the server device 3 determines that a user possessing this mail address qualifies for a member of a group corresponding to the disclosure range of data. On the other hand, when a text string called a-company is not included in a mail address of the user table 2T, the server device 3 determines that a user possessing this mail address is disqualified for a member of a group corresponding to the disclosure range of data.

The disclosure determination standard is created beforehand in the same way as with the conversion rule, significant information, and estimation rule at the time of constructing the data disclosure system.

The estimation rule table 7T is managed via an estimation rule management screen (not illustrated in the drawing) to be displayed on the display unit 37 of the display unit 27 of the terminal device 2 or the display unit 37 of the server device 3.

Figure 11:
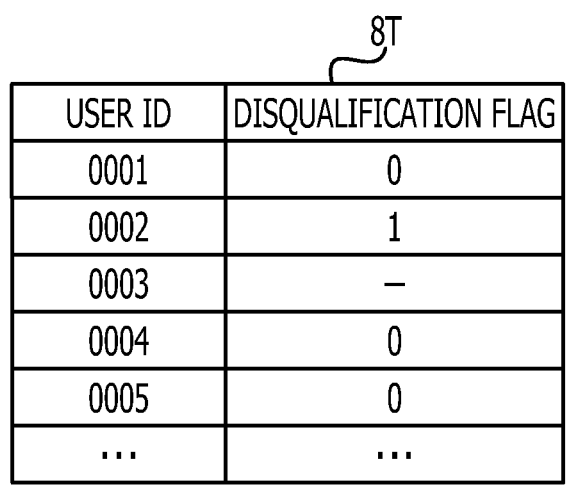
FIG. 11 is an explanatory diagram indicating an example of the record layout of a determination result table.

FIG. 11 is an explanatory diagram indicating an example of the record layout of the determination result table 8T. The determination result table 8T includes the columns of user ID and disqualification flag. The user ID is the same as the user ID of the user table 2T. The disqualification flag is an identification symbol to be written in the event that determination is made by the server device 3 regarding whether to be qualified for a member belonging to the disclosure range. The default value of the disqualification flag is a blank, for example. In the event of being qualified for a member belonging to the disclosure range, 0 is stored in the disqualification flag, for example. In the event of being disqualified for a member belonging to the disclosure range, 1 is stored in the disqualification flag, for example. In the event that determination has not been determined by the server device 3 regarding whether to be qualified for a member belonging to the disclosure range, the disqualification flag is still a blank.

Note that the determination result table 8T is a work table, and the server device 3 executes initialization to delete a record before and after use thereof.

Next, an example of the operation of the data disclosure system will be described.

The user activates a browser at the terminal device 2, for example. The user then logs into the server device 3 from the terminal device 2 through authentication processing according to the user ID and password. Specifically, the user accesses a website of the data disclosure system. The server device 3 may hold session information as to users in the RAM 33 and the hard disk 24 of the terminal device 2 after the valid authentication process. Therefore, even when the terminal device 2 does not transmit the user ID and password to the server device 3 one by one, the server device 3 authenticate users corresponding to the terminal device 2.

A user who discloses data registers a group made up of members to be disclosed in the server device 3 beforehand. Specifically, the user inputs the name of a group to be newly registered, and a member belonging to this group from a disclosure range registration screen (not illustrated in the drawing) displayed on the display unit 27 of the terminal device 2. The members of the group mentioned here also serve as users who employ the data disclosure system. Information of a member to be input from the disclosure range registration screen includes the user IDs of the user table 2T. In the event that input of the group name and the user IDs of the members has been completed, the group name and the user IDs of the members are transmitted from the terminal device 2 to the server device 3.

The server device 3 accepts the group name and the user IDs of the members from the terminal device 2. The server device 3 newly originates a group ID, and registers the originated group ID, accepted group name and the user ID of a user who registers the group in the group table 1T. The user ID of the user who registers the group mentioned here is the user ID of a user corresponding to the terminal device 2 which transmitted the group name and the user IDs of the members. The server device 3 registers the newly originated group ID and the user IDs of the accepted members in the group member related table 3T in a correlated manner.

The user shoots an image using the camera 1. In such a case, the camera 1 stores the image recorded by the imaging unit 16 in the storage unit 12 as the image file 1F. Also, the camera 1 generates the position based on the radio waves received by the GPS reception unit 15, the date and time counted by the timer 13, and the user ID as the metadata 1D of the image file 1F, and stores in the storage unit 12 correlated with the image file 1F. Note that, in the event that the GPS reception unit 15 is in an environment where it is difficult to receive radio waves from a GPS satellite, the camera 1 takes the identification information of the wireless LAN access point as metadata 1D regarding the position, for example.

The camera 1 transmits the image file 1F and metadata 1D to the terminal device 2 via the communication unit 18.

The terminal device 2 receives the image file 1F and metadata 1D from the camera 1 via the communication unit 26, and stores the received image file 1F and metadata 1D in the hard disk 24. In the event that the user has added a title or remarks to the metadata 1D, the terminal device 2 stores the metadata 1D to which the title or remarks have been added, in the hard disk 24.

In the event that a URL request for disclosing the image file 1F has been transmitted from the terminal device 2 to the server device 3, the server device 3 generates a disclosed data registration screen, and transmits the generated disclosed data registration screen to the terminal device 2 as a response. The terminal device 2 displays the received disclosed data registration screen on the screen of the browser.

Figure 12:
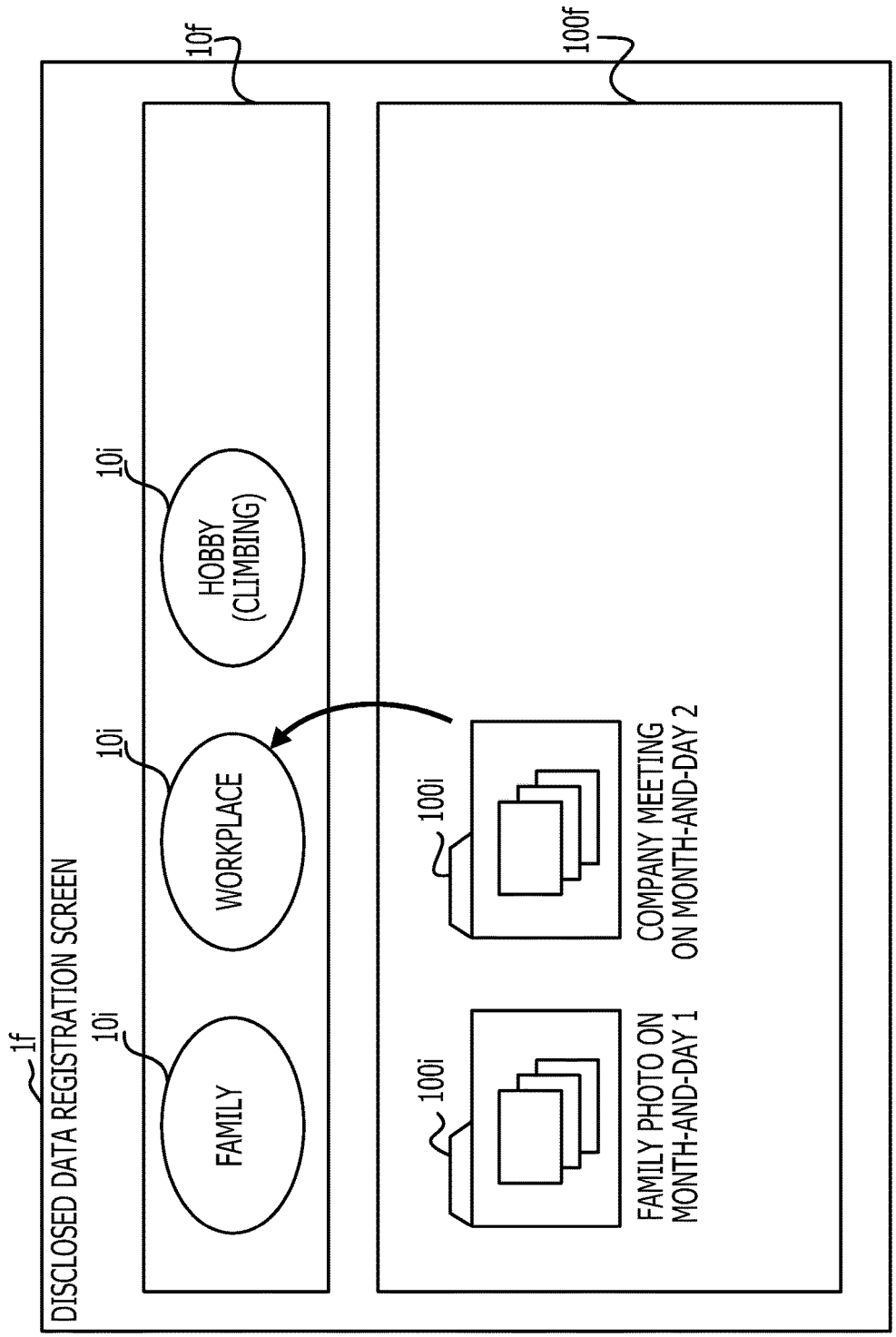
FIG. 12 is an explanatory diagram illustrating an example of the layout of a disclosed data registration screen.

FIG. 12 is an explanatory diagram illustrating an example of the layout of a disclosed data registration screen 1f. The disclosed data registration screen if is a screen to be displayed on a browser, and includes the child screens of a group icon screen 10f and a folder icon screen 100f.

The group icon screen 10f is displayed on the upper tier of the disclosed data registration screen 1f. A group icon 10i is displayed on the group icon screen 10f. The group icon 10i is an icon indicating a group to disclose data registered beforehand by a user who discloses data. A group name is displayed on the group icon 10i. Note that the server device 3 generates a group icon 10i of the disclosed data registration screen if with reference to the group table 1T. At this time, the server device 3 correlates the group icon 10i with the group ID as a non-display attribute.

With the example in FIG. 12, the group icons 10i of family, workplace, and hobby (climbing) are displayed on the group icon screen 10f.

The folder icon screen 100f is displayed from the middle tier to the lower tier of the disclosed data registration screen 1f. A folder icon 100i is displayed on the folder icon screen 100f. The folder icon 100i is an icon indicating a folder where the image file 1F stored in the hard disk 24 of the terminal device 2 is stored. A folder name is displayed below the folder icon 100i. The folder icon screen 100f is displayed on the screen of the browser by a plug-in program of the browser accessing the image file 1F and metadata 1D of the hard disk 24.

With the example in FIG. 12, the folder icons 100i of family photo on month-and-day 1 and company meeting on month-and-day 2 are displayed on the folder icon screen 100f.

The user drags and drops a folder icon 100i of the image file 1F to be disclosed, to the group icon 100i corresponding to the group to disclose data. In such a case, the terminal device 2 transmits the group ID correlated with the group icon 100i, image file 1F, and metadata 1D to the server device 3. Note that the image file 1F may be transmitted at timing separately from transmission of the group ID and metadata 1D. The server device 3 accepts at least the group ID and metadata 1D.

The server device 3 originates a data ID, and registers the originated data ID and accepted metadata 1D in the metadata table 5T. At this time, in the event that position information included in the accepted metadata 1D is the identification information of the wireless LAN access point, the server device 3 converts the identification information of the wireless LAN access point into the position information of the wireless LAN access point. Therefore, the hard disk 34 of the server device 3 stores a table (not illustrated in the drawing) in which the identification information of the wireless LAN access point and the position information of the wireless LAN access point is recorded in a correlated manner.

In the event of having accepted the image file 1F, the server device 3 registers the originated data ID and accepted group ID in the disclosed data group related table 4T.

The server device 3 extracts, based on the accepted group ID, the user ID of a member belonging to a disclosure range specified by the user from the group member related table 3T.

The server device 3 converts the accepted metadata 1D or metadata ID registered in the metadata table 5T into significant information with reference to the conversion rule table 6T. The server device 3 obtains a disclosure determination standard from the conditions including the converted significant information with reference to the estimation rule table 7T. The server device 3 evaluates, based on the obtained disclosure determination standard, the attribute of the user corresponding to the user ID extracted from the user table 2T, and determines whether or not the image file 1F may be disclosed to this user.

The server device 3 generates a determination result screen whereby the determination result of each of the members belonging to a disclosure range specified by the user may be referenced, and transmits the generated determination result screen to the terminal device 2. The determination result screen will be described later.

Now, description will be made regarding processing that the data disclosure system executes by exemplifying specific data. Hereafter, the disclosure determination standard is taken as an attribute arranged to determine a mail address.

Note that the disclosure determination standard generally has a format of {attribute name=text string}, an attribute specified with "attribute name" is compared with the attribute of the user. Here, "=" is a comparative operator, and means that the specified text string is included in the attribute data corresponding to the attribute name.

For example, in the event that an image that the user shot at a meeting relating to a hobby is shared with another user with the data disclosure system, the disclosure determination standard may be a text string relating to a hobby. As for a specific example, the disclosure determination standard is provided with a format such as {hobby=climbing}.

Also, with the present embodiment, though the user attributes are managed within the server device 3, an inquiry may also be preformed as to a user attribute separately managed by a directory server. In this case, a protocol for directory access which has widely been employed, e.g., LDAP (Light-weight Directory Access Protocol) or the like is employed.

Tentatively, let us say that a user who discloses data is Mr. AA of user ID=0001 registered in the user table 2T in FIG. 5. Let us say that, with the server device 3, according to group registration from Mr. AA, A company of group ID=0001 has been registered in the group table 1T in FIG. 4. Also, with the server device 3, according to group registration of Mr. AA, let us say that a member corresponding to group ID=0001 has been registered in the group member related table 3T in FIG. 6. For example, with the example in FIG. 6, user IDs corresponding to group ID=0001 are four of 0001, 0002, 0004, and 0005.

Mr. AA drags and drops the image file 1F and metadata 1D, regarding an image shot within A company on month-and-day 2 from the disclosed data registration screen 1f, onto the group icon 10i of the workplace. Group ID=0001 is correlated with the group icon 10i of the workplace as a non-display attribute. The terminal device 2 transmits at least the group ID and metadata ID to the server device 3 with this event as a trigger.

The server device 3 extracts, based on the accepted group ID=0001, the user IDs (0001, 0002, 0004, and 0005) of members belonging to the disclosure range. The server device 3 searches for a record where the position of the metadata 1D is consistent with the conversion rule of the conversion rule table 6T. Now, let us say that the location of the metadata 1D is consistent with the conversion rule of conversion rule ID=0001 in FIG. 9, for example. Therefore, the server device 3 converts the location of the metadata 1D into A company that is significant information corresponding to conversion rule ID=0001. The server device 3 then references the estimation rule table 7T and obtains {email=a-company} that is the disclosure determination standard from a record of estimation rule ID=0001 of which the significant information is A company. Incidentally, with the estimation rule table 7T, the estimated disclosure range corresponding to estimation rule ID=0001 is within A company.

The server device 3 determines whether or not the obtained a-company is included in the mail address corresponding to user IDs=0001, 0002, 0004, and 0005, with reference to the user table 2T.

In order to perform the above-mentioned determination, the server device 3 splits the mail address with a dot (.), and compares the text string of the split mail address with a text string included in the disclosure determination standard, for example. The server device 3 determines whether or not the text string of the split mail address contains a text string consistent with a text string included in the disclosure determination standard. Alternatively, the server device 3 determines whether or not a text string included in the disclosure determination standard is included in a mail address of the user table 2T, using a fuzzy search.

As a result thereof, it is found that that a-company is included in the mail addresses corresponding to user IDs=0001, 0004, and 0005 in FIG. 5, and a-company is not included in the mail address corresponding to user ID=0002. That is to say, the server device 3 determines that the mail addresses of Mr. AA, Ms. DD, and Mr. EE satisfy the disclosure determination standard, and the mail address of Mr. BB does not satisfy the disclosure determination standard.

Therefore, the server device 3 writes 0 in the disqualification flags corresponding to user IDs=0001, 0004, and 0005 of the determination result table 8T, and writes 1 in the disqualification flag corresponding to user ID=0002. The server device 3 generates the determination result screen illustrating the determination result regarding each of the users extracted as members belonging to a disclosure group with reference to the disqualification flags of the determination result table 8T. The server device 3 transmits the generated determination result screen to the terminal device 2.

Note that the server device 3 may execute the above-mentioned processing after storing information corresponding to the disqualification flags of the determination result table 8T in the RAM 33. In such a case, the server device 3 may not use the determination result table 8T.

Figure 13:
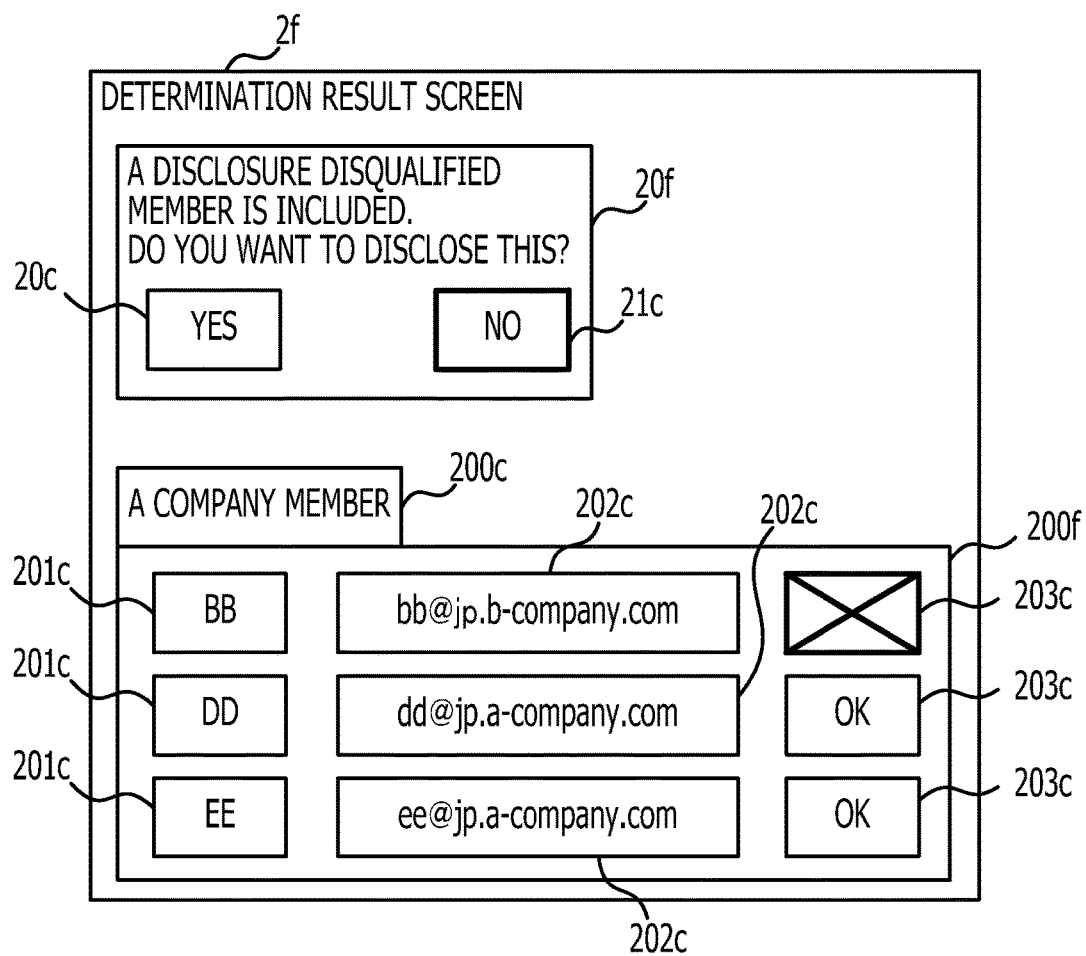
FIG. 13 is an explanatory diagram illustrating an example of the layout of a determination result screen.

FIG. 13 is an explanatory diagram illustrating an example of the layout of a determination result screen 2f. The determination result screen 2f includes the child screens of a Yes-No screen 20f and a list screen 200f. The Yes-No screen 20f is displayed on the left side of the upper tier of the determination result screen 2f. The list screen 200f is displayed on the middle tier through the lower tier of the determination result screen 2f.

The Yes-No screen 20f is displayed in the event that a disqualified member is included in the disclosure range as a result of determining consistency between the disclosure determination standard and the attributes of users. A message called "A disclosure disqualified member is included. Do you want to disclose this?" is displayed on the upper portion of the Yes-No screen 20f, for example.

The Yes-No screen 20f includes a Yes button 20c and a No button 21c. In the event that the Yes button 20c has been selected, a selection result thereof is transmitted from the terminal device 2 to the server device 3, and the server device 3 executes disclosure processing of data. In the event that the No button 21c has been selected, a selection result thereof is transmitted from the terminal device 2 to the server device 3, and the server device 3 generates a disclosure member editing screen (not illustrated in the drawing) to edit a member of the disclosure range, and transmits this disclosure member editing screen to the terminal device 2. A user who discloses data edits a member of the disclosure group from the disclosure member editing screen. The terminal device 2 transmits an editing result thereof to the server device 3. The server device 3 accepts the editing result regarding a member of the disclosure group from the terminal device 2, and based on the accepted editing result, executes disclosure processing of data after updating the group member related table 3T.

As a result of determining consistency between the disclosure determination standard and the mail addresses of the user table 2T, in the event that a disqualified member has not been found, the Yes-No screen 20f is not displayed. In such a case, a message called "No disclosure disqualified member has not been found" is displayed on the upper portion of the determination result screen 2f.

The list screen 200f is a screen indicating whether or not a member belonging to the specified disclosure range qualifies for a member of the disclosure range. With the list screen 200f, the members extracted as the disclosure range of data are listed. Note that though a user who discloses data (e.g., Mr. AA) belongs to members of the disclosure group, with the example of the list screen 200f in FIG. 13, this is not indicated. The list screen 200f may list users who disclose data, or may not.

The list screen 200f includes a disclosure range label 200c, a full name label 201c, an attribute label 202c, and a disqualification flag label 203c. The disclosure range label 200c is a part arranged to display a text string including the name of a group that is a disclosure range of data. The name of a group that is a disclosure range of data is a group name of the group table 1T, for example. The full name label 201c is a part arranged to display a full name of the user table 2T. The attribute label 202c is a part arranged to display the attribute of a user registered in the user table 2T. With the example in FIG. 13, a mail address of the user table 2T is displayed on the attribute label 202c. The disqualification flag label 203c is a part arranged to display information corresponding to a disqualification flag of the determination result table 8T. With the example in FIG. 13, in the event of Mr. BB of which the disqualification flag is 1, X indicating an alert is displayed on the disqualification flag label 203c. Also, with the example in FIG. 13, in the event of Ms. DD and Mr. EE whose disqualification flags are 0, OK is displayed on the disqualification flag label 203c.

With the determination result screen 2f in FIG. 13, let us say that Mr. AA has selected the No button 21c. The terminal device 2 transmits Mr. AA's selection result to the server device 3. The server device 3 extracts members corresponding to group ID=0001 from the group member related table 3T. The server device 3 generates a disclosure member editing screen (not illustrated in the drawing) arranged to edit the extracted members, and transmits the generated disclosure member editing screen to the terminal device 2. Now, let us say that Mr. AA has performed editing to delete Mr. BB from the members belonging to A company of group ID=0001. The terminal device 2 transmits the editing result by Mr. AA to the server device 3. The server device 3 executes processing to delete Mr. BB (user ID=0002) as an A company's member from the group member related table 3T.

The server device 3 extracts user IDs corresponding to group ID=0001 from the group member related table 3T after updating processing. The server device 3 obtains mail addresses corresponding to the extracted user IDs from the user table 2T. For example, the server device 3 obtains mail addresses of Mr. AA, Ms. DD, and Mr. EE. The server device 3 transmits a mail where a URL to access the image file 1F uploaded by Mr. AA is described to the obtained mail addresses. The URL mentioned here is a URL including, for example, a random text string which suppresses general users from obtaining the URL.

Note that the server device 3 may transmit the above-mentioned mail to Mr. AA who uploaded the image file 1F, or may not.

The terminal devices 2 which Ms. DD and Mr. EE possess each receive the above-mentioned mail from the server device 3. For example, in the event that Ms. DD has accessed the URL described in the above-mentioned mail from the terminal device 2, the server device 3 transmits a screen in which the image of the image file 1F uploaded by Mr. AA is embedded to Ms. DD's terminal device 2.

Note that, with the description so far, in order to restrict the disclosure range of data, the server device 3 has provided the URL accessible to the data to a particular user alone. On the other hand, it goes without saying that authentication processing according to a user ID and password may be employed to restrict the disclosure range of data. For example, in the above-mentioned case, the server device 3 allows only the terminal device 2 which passed through authentication according to Mr. AA's, Ms. DD's, or Mr. EE's user ID and password to perform access to the image file 1F uploaded by Mr. AA.

Figure 14:
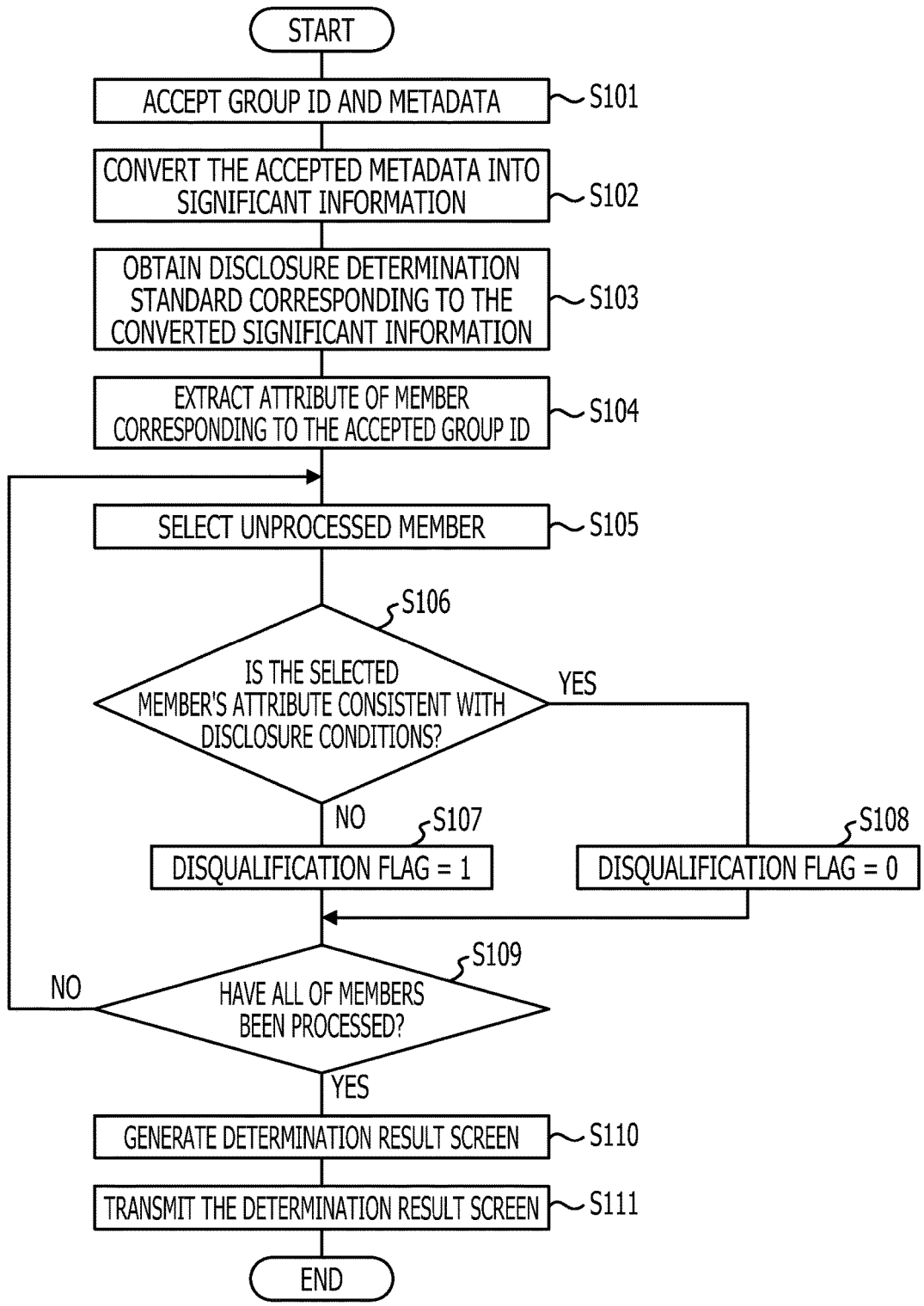
FIG. 14 is a flowchart illustrating a procedure of disclosure range determination processing that a server device executes.

FIG. 14 is a flowchart illustrating an example of a procedure of disclosure range determination processing that the server device 3 executes. The control unit 31 accepts a group ID and metadata 1D from the terminal device 2 (step S101). The control unit 31 converts, based on the conversion rule table 6T, the accepted metadata 1D into significant information (step S102). The control unit 31 obtains a disclosure determination standard corresponding to the converted significant information from the estimation rule table 7T (step S103). The control unit 31 extracts the attributes of members corresponding to the accepted group ID, from the group member related table 3T (step S104). The control unit 31 selects an unprocessed member regarding the following processing from the extracted members' attributes (step S105).

The control unit 31 determines whether or not the selected user's attribute is consistent with the disclosure conditions, by searching for an attribute and text string specified in the obtained disclosure determination standard from the selected member's attribute (step S106). In the event that determination is made that the selected user's attribute is not consistent with the disclosure conditions (NO in step S106), the control unit 31 writes 1 in the disqualification flag of the determination result table 8T (step S107). In the event that determination is made that the selected user's attribute is consistent with the disclosure conditions (YES in step S106), the control unit 31 writes 0 in the disqualification flag of the determination result table 8T (step S108).

The control unit 31 determines whether the processing from step S105 to step S108 has been executed regarding all of the members whose attributes were extracted (step S109). In the event that the processing from step S105 to step S108 has not been executed regarding all of the members whose attributes were extracted (NO in step S109), the control unit 31 returns the processing to step S105. In the event that the processing from step S105 to step S108 has been executed regarding all of the members whose attributes were extracted (YES in step S109), the control unit 31 generates the determination result screen 2f (step S110). The control unit 31 transmits the generated determination result screen 2f to the terminal device 2 (step S111), and ends the processing.

In order to obtain the disclosure determination standard from the metadata 1D corresponding to the image file 1F, the server device 3 executes two-step processing of a step arranged to convert the metadata 1D into significant information, and a step arranged to convert significant information into the disclosure determination standard corresponding to the estimated disclosure range. Therefore, the conversion rule table 6T and estimation rule table 7T are stored in the hard disk 34 of the server device 3. These conversion rule table 6T and estimation rule table 7T may be combined into a single table based on the significant information string.

However, the conversion rule and estimation rule are created by a human being, and accordingly, in the event that the conversion rule table 6T and estimation rule table 7T are provided as separated tables, the conversion rule and estimation rule may readily be understood, which contributes to simplification. In order to maintain and manage the conversion rule and estimation rule in response to changing such as transfer of an organization, complexity of the organization, increase in data types, or the like, it is higher in convenience to maintain and manage the two tables of the conversion rule table 6T and estimation rule table 7T.

With the flowchart in FIG. 14, an example has been illustrated wherein the server device 3 executes the disclosure range determination processing regarding one image file 1F. In the event that a user discloses multiple image files 1F together, the server device 3 repeats the disclosure range determination processing in FIG. 14 just by the number of the image files 1F.

In the event that the disclosure range determination processing in FIG. 14 is executed, the group ID and metadata 1D have been transmitted from the terminal device 2 to the server device 3. On the other hand, transmission of the image file 1F from the terminal device 2 to the server device 3 may be performed before or after or simultaneously with transmission of the group ID and metadata 1D.

The disclosure range determination processing is stared with an drag and drop event performed by a user at the terminal device 2 as a trigger, for example. At this time, in the event of having the group ID and metadata 1D, the server device 3 may execute the disclosure range determination processing. Accordingly, transmission of the image file 1F from the terminal device 2 to the server device 3 may be performed before or after or simultaneously with transmission of the group ID and metadata 1D.

With the disclosed data registration screen if in FIG. 12, the user specifies the disclosure range by dragging and dropping the folder icon 100i to the group icon 10i. At this time, multiple disclosure ranges may be specified as to one image file 1F. For example, in FIG. 12, in the event that the folder icon 100i has been dragged and dropped on each of the multiple different group icons 10i, the server device 3 registers the data ID and group IDs in the disclosed data group related table 4T in one-to-many relationship.

According to the server device 3, whether or not there is an error on the disclosure range specified by the user who discloses data can be determined.

At least the metadata 1D is added to data to be disclosed. The server device 3 obtains a disclosure determination standard corresponding to the estimated disclosure range based on the metadata 1D by creating the conversion rule table 6T and estimation rule table 7T beforehand. Also, the server device 3 extracts the attributes of users belonging to the disclosure range specified by the accepted group ID to check whether or not the attribute and text string specified in the disclosure determination standard are included in the attributes of the users. Thus, the server device 3 may inform to a user who discloses data whether or not the specified disclosure range is wrong, or whether or not a member who does not want to disclose data is included in the specified disclosure range.

Second Embodiment

A second embodiment relates to a mode wherein a conversion rule and significant information are generated for each user based on the action history of the user. The server device 3 compares significant information corresponding to a user (predetermined user) who discloses data with significant information corresponding to a member belonging to the specified disclosure range to determine whether or not there is an error on the specified disclosure range.

Figure 15:
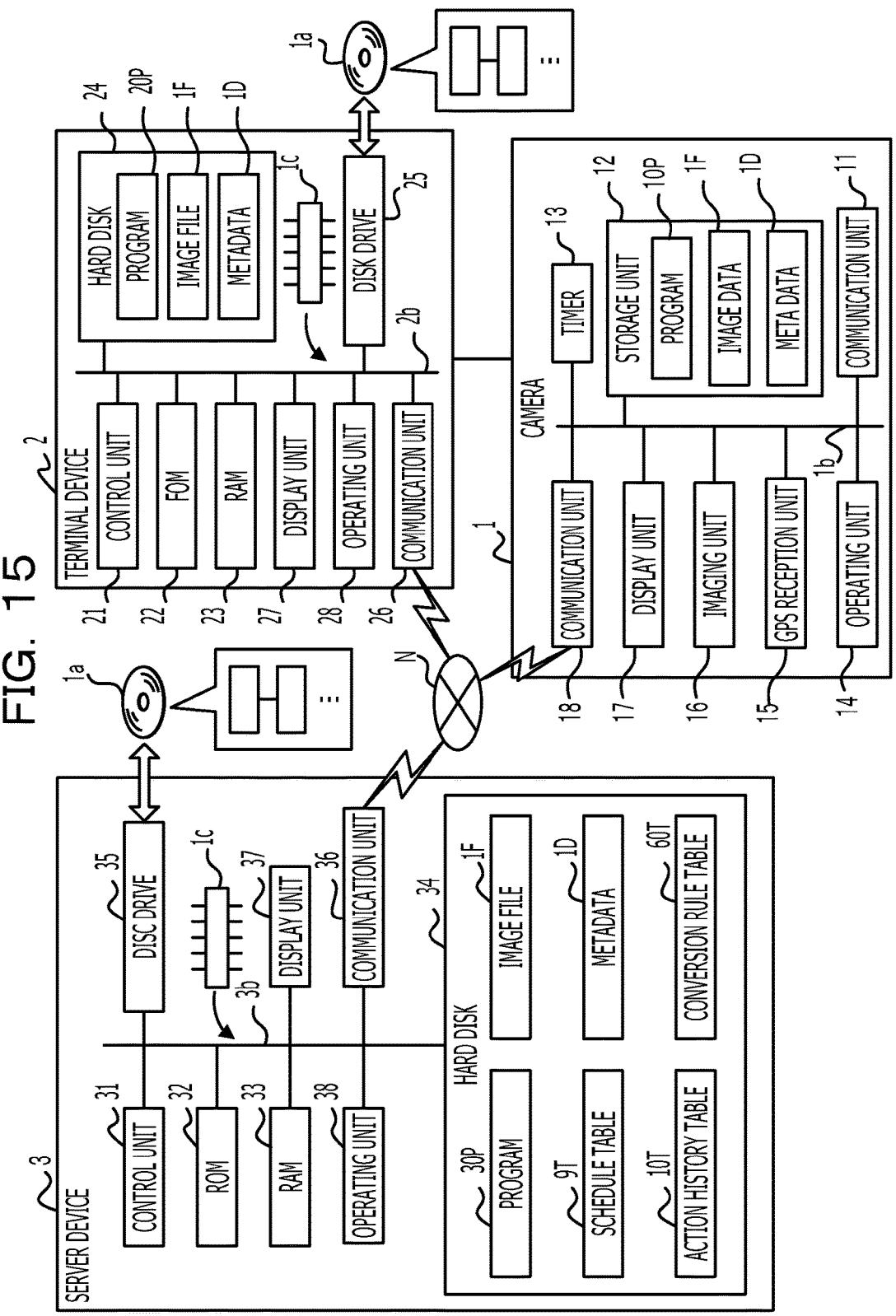
FIG. 15 is a block diagram illustrating a hardware configuration example of a data disclosure system.

FIG. 15 is a block diagram illustrating a hardware configuration example of a data disclosure system. The hardware configuration of a data disclosure system according to the second embodiment is the same as the hardware configuration of the data disclosure system according to the first embodiment. However, the image file 1F and metadata 1D regarding an image recorded by the camera 1 are transmitted to the server device 3 from the camera 1 instead of the terminal device 2, via the network N.

Note that, in the event that information transmission speed or communication path capacity (band width) from the camera 1 to the server device 3 is small, only the metadata 1D with smaller capacity is transmitted from the camera 1 to the server device 3. Also, in the event that information transmission speed or communication path capacity (band width) from the camera 1 to the server device 3 is small, the image file 1F with greater capacity is, in the same way as with the first embodiment, transmitted from the terminal device 2 to the server device 3.

A schedule table 9T and an action history table 10T are stored in the hard disk 34 of the server device 3 in addition to the various tables according to the first embodiment. FIG. 15 illustrates the various tables according to the first embodiment with a part thereof being omitted.

The schedule table 9T is a table arranged to manage the schedule for each user. The action history table 10T is a table arranged to store the history of an action that each user executes.

Next, an example of function outline of the data disclosure system will be described.

Figure 16:
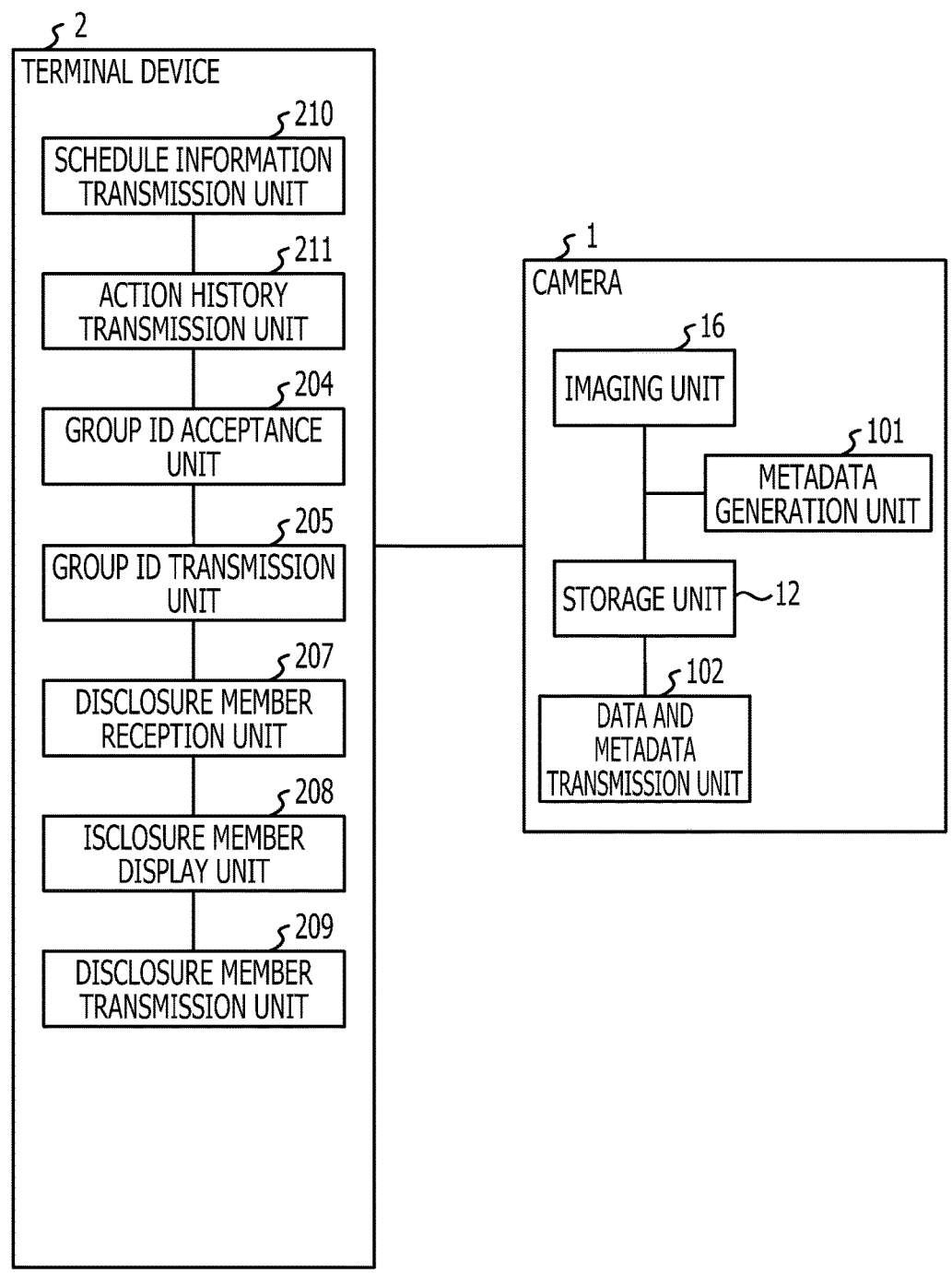
FIG. 16 is a function block diagram illustrating a function configuration example of the data disclosure system.
Figure 17:
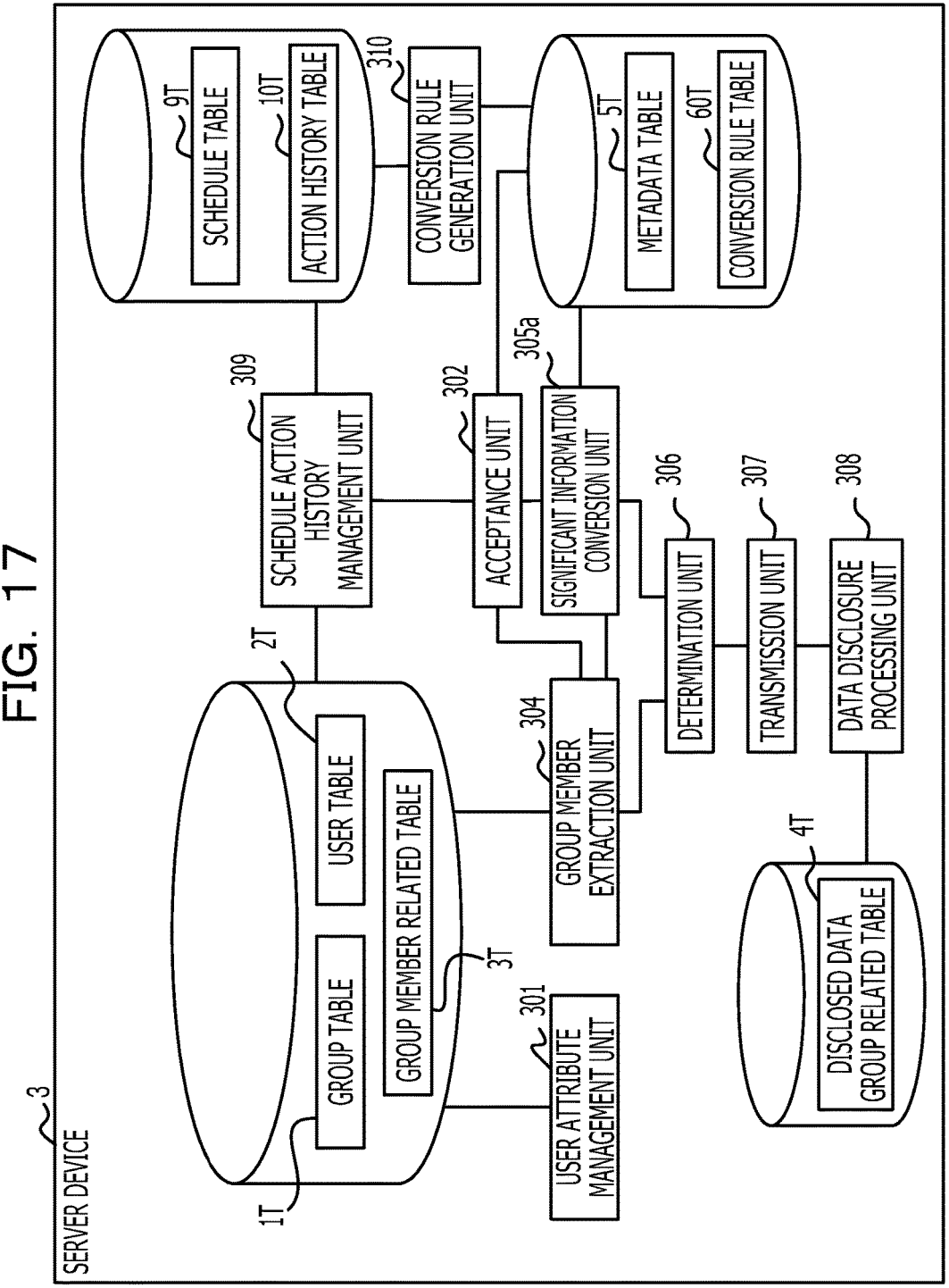
FIG. 17 is a function block diagram illustrating a function configuration example of the data disclosure system.

FIGS. 16 and 17 are function block diagrams illustrating a function configuration example of the data disclosure system. FIG. 16 illustrates an example of functions that each of the camera 1 and terminal device 2 has. FIG. 17 illustrates an example of functions that the server device 3 has.

The functional units according to the camera 1 in FIG. 16 function by the control unit 11 operating based on a program 10P stored in the storage unit 12. The functional units according to the terminal device 2 in FIG. 16 function by the control unit 21 operating based on a program 20P stored in the hard disk 24. The functional units according to the server device 3 in FIG. 17 function by the control unit 31 operating based on a program 30P stored in the hard disk 34.

The functions of the camera 1 are almost the same as the functions of the camera 1 according to the first embodiment. However, the data and metadata transmission unit 102 of the camera 1 transmits the image file 1F and metadata 1D to the server device 3. The data and metadata transmission unit 102 of the camera 1 transmits at least the metadata 1D to the terminal device 2. Note that the user ID of a user who is a possessor of the camera 1 is included in the metadata 1D.

The terminal device 2 includes a schedule information transmission unit 210 and an action history transmission unit 211. The schedule information transmission unit 210 transmits a user's schedule input from a schedule registration screen (not illustrated in the drawing) displayed on a browser to the server device 3, for example. The action history transmission unit 211 displays an action history screen (not illustrated in the drawing) transmitted from the server device 3 on the screen of a browser, for example. In the event of having performed actions following the schedule, the user performs a schedule confirmation operation from the action history screen. Alternatively, in the event of having performed an action different from the schedule, the user inputs the actually performed action to the action history screen. The action history transmission unit 211 transmits the user's operation result as to the action history screen to the server device 3.

The group ID acceptance unit 204 of the terminal device 2 accepts a group ID from the operating unit 28. The group ID transmission unit 205 transmits the group ID accepted by the group ID acceptance unit 204 and the metadata 1D accepted from the camera 1 to the server device 3. The functions of the disclosure member reception unit 207, disclosure member display unit 208, and disclosure member transmission unit 209 are the same as the functions in the first embodiment.

The functions of the server device 3 different from the first embodiment will be described. The server device 3 includes a schedule action history management unit 309. The acceptance unit 302 of the server device 3 accepts a user's schedule from the terminal device 2, and outputs the accepted schedule to the schedule action history management unit 309. The schedule action history management unit 309 accepts a user's schedule, and registers the accepted schedule in the schedule table 9T.

The acceptance unit 302 accepts confirmation of the schedule or the action history of a user different from the schedule from the terminal device 2, and outputs the accepted information to the schedule action history management unit 309. The schedule action history management unit 309 registers the user's action history in the action history table 10T according to the accepted information.

The acceptance unit 302 accepts the image file 1F and metadata 1D from the camera 1. The acceptance unit 302 registers the accepted metadata 1D in the metadata table 5T.

The server device 3 includes a conversion rule generation unit 310. The conversion rule generation unit 310 references the action history table 10T to generate a conversion rule and significant information for each user, and registers the generated conversion rule and significant information in the conversion rule table 60T.

The group member extraction unit 304 obtains a group ID from the acceptance unit 302. The group member extraction unit 304 references, based on the obtained group ID, the group member related table 3T to extract the user IDs of members belonging to the disclosure range specified by a user who discloses data. The group member extraction unit 304 outputs the extracted members' user IDs to the significant information conversion unit 305a and determination unit 306.

The significant information conversion unit 305a reads out the metadata 1D stored in the metadata table 5T, and converts the read metadata 1D into significant information with reference to the conversion rule table 60T. At this time, the significant information conversion unit 305a converts, regarding the members of the user IDs extracted by the group member extraction unit 304, the metadata 1D into significant information for each member. The significant information conversion unit 305a outputs the significant information converted from the metadata 1D for each member to the determination unit 306.

Note that the significant information conversion unit 305a may obtain the metadata 1D by accepting the metadata 1D from the acceptance unit 302 instead of obtaining the metadata 1D from the metadata table 5T.

The determination unit 306 accepts the user IDs of members belonging to the disclosure range specified by a user who discloses data, from the group member extraction unit 304. Also, the determination unit 306 accepts significant information corresponding to each member belonging to the disclosure range specified by the user, from the significant information conversion unit 305a.

The determination unit 306 compares significant information corresponding to a user who discloses data with significant information corresponding to each member belonging to the specified disclosure range.

Significant information based on the action history of a user who discloses data is consistent with the disclosure range specified by this user. On the other hand, according to the action history of each user, significant information based on the action history of each member extracted by the group member extraction unit 304 may be consistent with the specified disclosure range, or may not. Therefore, the determination unit 306 determines consistency or inconsistency between the specified disclosure range and a member to be scheduled as a disclosure destination. Here, a consistent member qualifies for the specified disclosure range, and an inconsistent member is disqualified for the specified disclosure range. The determination unit 306 creates a list including determination results regarding the members accepted from the group member extraction unit 304.

Description will be made regarding details of the schedule table 9T and action history table 10T stored in the hard disk 34 of the server device 3.

FIG. 18 is an explanatory diagram indicating an example of the record layout of the schedule table 9T. The schedule table 9T includes the columns of date, user ID, and full name. The date is the date of a schedule to be registered. The user ID is an identification symbol of a user corresponding to a schedule to be registered, and is the same as the user ID of the user table 2T. The full name is the full name of a user corresponding to a schedule to be registered, and is the same as the full name in the user table 2T.

The schedule table 9T includes the columns of category, contents, starting date and time, and expiration date and time. The category is rough classifications of schedules, and includes, e.g., hobby, meeting, business trip, leisure, training, and so forth. The contents are more specific classifications of schedules, and includes, e.g., climbing, planning meeting, XX company visits, travel, dinner, YY seminar, driving, and so forth. The starting date and time, and expiration date and time are the start date and time, and end date and time of a schedule, respectively. The starting date and time, and expiration date and time may additionally include days in the event that a schedule extends to multiple days sandwiching midnight.

The schedule table 9T includes the columns of place, and registration date. The place is a place where a user planned to stay at point-in-time corresponding to a schedule. The place includes, e.g., a geographic name, address, facility name, and so forth. The facility name may include, e.g., information determining a room within the building structures of the facility thereof. The registration date is the date when a schedule was registered.

FIG. 19 is an explanatory diagram indicating an example of the record layout of the action history table 10T. The action history table 10T is a table arranged to store the history of actions that each user executed based on the contents of the schedule table 9T. A user may not act on schedule, and accordingly, a record of the action history table 10T may be consistent with or the same as a record of the schedule table 9T, or may be inconsistent therewith or differ therefrom.

The action history table 10T includes the columns of user ID, date and time 1, and date and time 2. The user ID is the identification information of a user, and is the same as the user ID of the user table 2T. The date and time 1, and date and time 2 are date and time corresponding to the start of action history and date and time corresponding to the end of action history, respectively.

The action history table 10T includes the columns of location, category, and contents. The location, category, and contents conform to the place, category, and contents of the schedule table 9T, respectively. The location is a place where a user stayed at point-in-time corresponding to action history. The category is rough classifications of action history. The contents are more specific classifications of action history.

Next, an example of the operation of the data disclosure system will be described.

Hereafter, let us assume that Mr. AA, Ms. DD, and Mr. EE corresponding to user IDs=0001, 0004, and 0005 in the user table 2T in FIG. 5 respectively are climbing partners who sometimes go to a mountain together. Let us say that Mr. AA, Ms. DD, and Mr. EE have been planning to climb Mt. Blackburn on so-and-so month-and-day, 20xx together. Let us say that Mr. AA will go to Mt. Blackburn, and disclose images shot on Mt. Blackburn to the climbing partners using the data disclosure system.

Mr. AA inputs a group name called climbing on Mt. Blackburn on month, day, and the group members' user IDs=0001, 0004, and 0005 from the disclosure range registration screen (not illustrated in the drawing) displayed on the display unit 27 of the terminal device 2. The terminal device 2 transmits the group name and the user IDs of the group members to the server device 3.

The server device 3 accepts the group name and members' user IDs from the terminal device 2. The server device 3 registers the accepted group name and members' user IDs in the group table 1T and group member related table 3T.

Mr. AA inputs a schedule from the schedule registration screen (not illustrated in the drawing) displayed on the display unit 27 of the terminal device 2. The contents of the schedule thereof are, e.g., date=so-and-so month-and-day, 20xx, category=hobby, contents=climbing, starting date and time=8:10, expiration date and time=18:45, and place=Mt. Blackburn. The terminal device 2 transmits Mr. AA's schedule to the server device 3.

The server device 3 accepts Mr. AA's schedule from the terminal device 2. The server device 3 registers the accepted Mr. AA's schedule in the schedule table 9T. The record on the uppermost tier in FIG. 18 indicates Mr. AA's schedule example. Note that the server device 3 references the user table 2T based on the user ID to write Mr. AA's full name in the full name of the schedule table 9T. The server device 3 writes the system date at the time of registering the record in the registration date of the schedule table 9T.

Ms. DD and Mr. EE who are the climbing partners of Mr. AA also input a schedule to her and his terminal devices in the same way as with Mr. AA, respectively. The terminal devices 2 transmit the schedules of Ms. DD and Mr. EE to the server device 3 respectively, and the server device 3 registers the accepted information in the schedule table 9T. The records of the 2nd and 3rd rows in FIG. 18 indicate schedule examples of Ms. DD and Mr. EE, respectively.

The data disclosure system confirms the contents of the schedule table 9T at the end of a day on the expiration date and time and thereafter of the schedule table 9T. For example, the terminal devices of Mr. AA, Ms. DD, and Mr. EE display a schedule confirmation screen (not illustrated in the drawing) called "Did you stay on Mt. Blackburn from 8:10 to 18:45 on so-and-so month-and-day?" on the display unit 27. The schedule confirmation screen includes a Yes button and a No button, and in the event that the Yes button has been selected, a result thereof is transmitted from the terminal device 2 to the server device 3. On the other hand, in the event that the No button has been selected, the terminal device 2 displays an action history input screen (not illustrated in the drawing) where information called "Where did you stay from when to when" is input. In the event that action history information has been input to the action history input screen and a predetermined operation has been accepted, the terminal device 2 transmits the action history of the input user to the server device 3.

Now, let us assume that on the day so-and-so month-and-day, Mr. AA and Ms. DD carried out climbing of Mt. Blackburn on schedule. However, let us say that Mr. EE suddenly changed his schedule, and climbed Mr. Whitney together with another climbing partner on the so-and-so month-and-day, for example.

Mr. AA shoots an image on Mt. Blackburn using the camera 1. The image file 1F and metadata 1D thereof are transmitted from the camera 1 to the server device 3. Also, the metadata 1D is transmitted from the camera 1 to the terminal device 2. Note that the title and remarks of the metadata table 5T are not included in the metadata 1D to be transmitted from the camera 1 to the server device 3 and terminal device 2.

The server device 3 accepts the image file 1F and metadata 1D from the camera 1. The server device 3 registers the accepted metadata 1D in the metadata table 5T. In the event that determination will be made later whether or not a member of a group registered by Mr. AA qualifies for the disclosure range, the server device 3 employs this metadata 1D.

After coming home from Mt. Blackburn, Mr. AA and Ms. DD select the Yes button of the schedule confirmation screen. The terminal devices 2 of Mr. AA and Ms. DD each transmit a selection result according to the Yes button to the server device 3. On the other hand, Mr. EE selects the No button of the schedule confirmation screen. Mr. EE inputs his action history to the effect that he stayed on Mt. Whitney from 9:30 on so-and-so month-and-day, 20xx to 16:15 on so-and-so month-and-day, 20xx to the action history input screen. Also, Mr. EE inputs category and contents regarding an actual action to the action history input screen. Mr. EE's terminal device 2 transmits the input Mr. EE's action history to the server device 3.

The server device 3 accepts the selection result of the Yes button being selected in the schedule confirmation screen, from the terminal devices 2 of Mr. AA and Ms. DD. The server device 3 references the schedules of Mr. AA and Ms. DD in the schedule table 9T to register the determined action history of Mr. AA and Ms. DD in the action history table 10T. For example, the records of the 1st and 2nd rows in the action history table 10T in FIG. 19 indicate the action history of Mr. AA and Ms. DD, respectively.

The server device 3 accepts Mr. EE's action history from Mr. EE's terminal device 2. The server device 3 registers the accepted Mr. EE's action history in the action history table 10T. For example, the 3rd record in the action history table 10T in FIG. 19 indicates Mr. EE's action history.

In the event of having registered a user's action history in the action history table 10T, the server device 3 generates a conversion rule and significant information based on the registered action history. The server device 3 originates a conversion rule ID, and registers the originated conversion rule ID and generated conversion rule and significant information in the conversion rule table 60T.

FIG. 20 is an explanatory diagram indicating an example of the record layout of the conversion rule table 60T. FIG. 20 indicates the conversion rule table 60T according to the second embodiment. The conversion rules and significant information in the conversion rule table 6T in FIG. 9 according to the first embodiment are created by human beings. However, the server device 3 generates a conversion rule and significant information in the conversion rule table 60T in FIG. 20.

The 1st, 2nd, and 3rd records in the conversion rule table 60T in FIG. 20 indicate record examples registered based on the action history of Mr. AA (user ID=0001), Ms. DD (user ID=0004), and Mr. EE (user ID=0005), respectively. The user IDs in the conversion rule table 60T in FIG. 20 are the same as the user IDs in the action history table 10T in FIG. 19. The metadata name in the conversion rule table 60T in FIG. 20 is the name or category of the metadata 1D to be converted into significant information using a conversion rule, and time here. The conversion rules in the conversion rule table 60T in FIG. 20 are periods made up of date & time 1 and date & time 2 in the action history table 10T in FIG. 19. Significant information in the conversion rule table 60T in FIG. 20 is a combination between date extracted from the date & time 1 and date & time 2 in the action history table 10T in FIG. 19 and a place in the action history table 10T in FIG. 19.

The conversion rule and significant information corresponding to conversion rule ID=2007 in FIG. 20 differs from the conversion rules and significant information corresponding to conversion rule IDs=2005 and 2006. This is because MR. EE performed an action different from the actions of Mr. AA and Ms. DD.

Note that use modes of the conversion rule table 60T differ between the first embodiment and the second embodiment. Therefore, in order to make this difference clear, a column to store a flag indicating difference of the use modes of the conversion rule table 60T may be added to the conversion rule table 60T.

With the example in FIG. 20, the significant information of the conversion rule table 60T includes the place in the action history table 10T. The significant information of the conversion rule table 60T may include time information, or may not. In the event that the significant information of the conversion rule table 60T includes time information, the time information thereof may be time including fine hour and minute, or may be time made up of a month alone.

Figure 21:
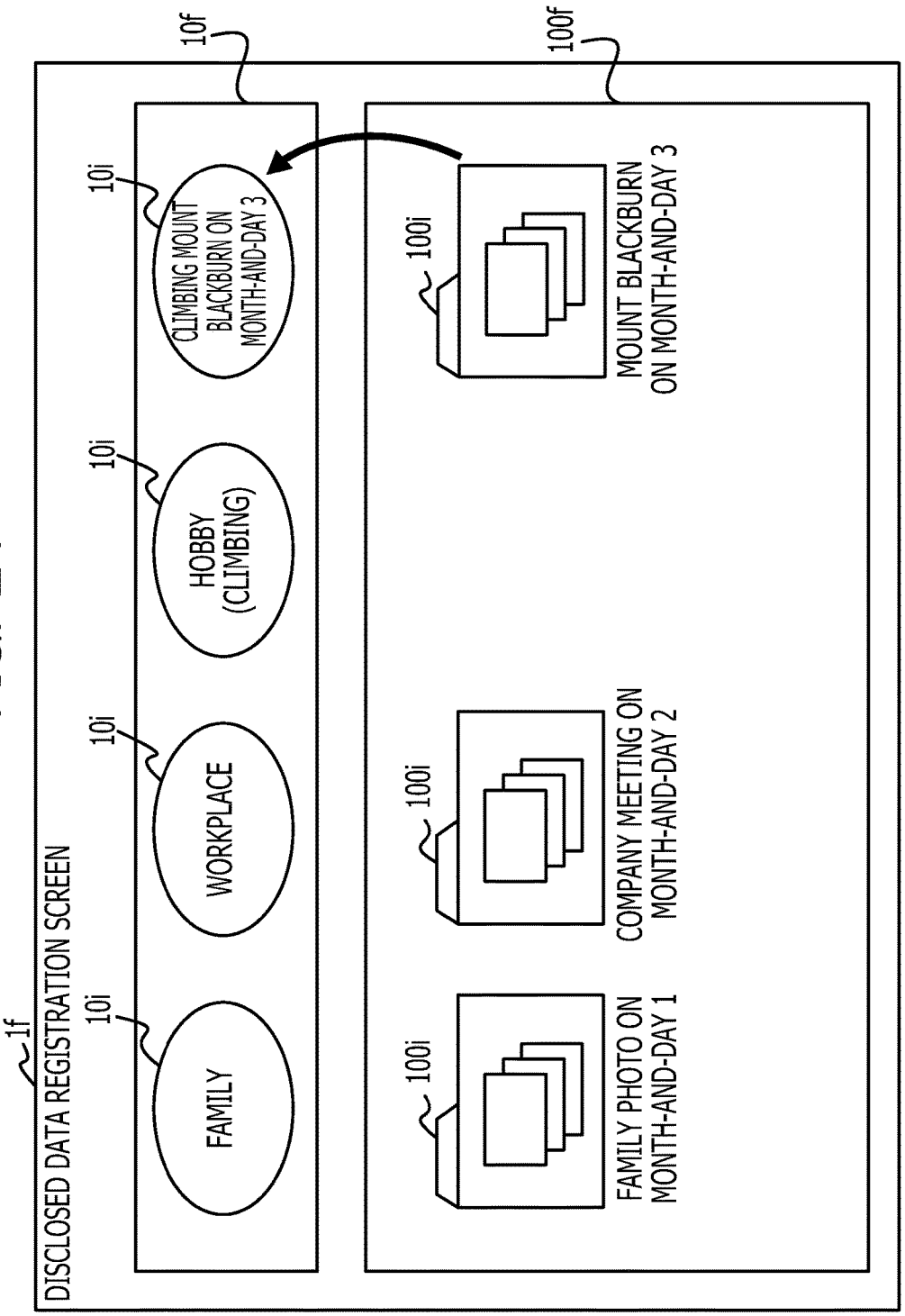
FIG. 21 is an explanatory diagram illustrating an example of the layout of a disclosed data registration screen.

FIG. 21 is an explanatory diagram indicating an example of the layout of the disclosed data registration screen 1f. Mr. AA launches a browser to access the data disclosure system, for example. With the browser, the disclosed data registration screen 1f in FIG. 21 is displayed.

With the right side of the group icon screen 10f in FIG. 21, a group icon 10i of "climbing of Mr. Blackburn on month-and-day 3" registered by Mr. AA is displayed. The group icon 10i is correlated with a group ID as a non-display attribute. With the right side of the upper portion of the folder icon screen 100i, a folder icon 100i having the name of Mt. Blackburn on month-and-day 3 is displayed. The metadata 1D is stored in the folder icon 100i, for example.

Mr. AA drags and drops the folder icon 100i having the name of Mt. Blackburn on month-and-day 3 to the group icon 10i of "climbing of Mr. Blackburn on month-and-day 3". The terminal device 2 transmits the group ID correlated with the metadata 1D and folder icon 100i to the server device 3 with this drag and drop event as a trigger.

The server device 3 accepts the metadata 1D and group ID. The image file 1F and metadata 1D relating to an image imaged on Mt. Blackburn by Mr. AA has already been transmitted to the server device 3 by the camera 1. The server device 3 correlates, based on the metadata 1D accepted from the terminal device 2, the image file 1F and metadata 1D already accepted from the camera 1 with the group ID accepted from the terminal device 2. Note that Mr. AA's user ID is included in the above-mentioned metadata 1D.

The server device 3 extracts, based on the accepted group ID, member users (e.g., 0001, 0004, and 0005) belonging to the disclosure range. The server device 3 references the conversion rule table 60T to convert the creating date and time of the accepted metadata 1D into significant information for each extracted member. For example, in the event that the creating date and time of the metadata 1D correlated with the image file 1F is 12:00 on so-and-so month-and-day, 20xx, the significant information of Mr. AA and Ms. DD that the server device 3 converts is Mt. Blackburn on so-and-so month-and-day, 20xx (see FIG. 20). On the other hand, the significant information of Mr. EE that the server device 3 converts is Mt. Whitney on so-and-so month-and-day, 20xx (see FIG. 20). In the above-mentioned case, Mr. AA's significant information and Ms. DD's significant information agree, and Mr. AA's significant information and Mr. EE's significant information do not agree.

The server device 3 compares the significant information of Mr. AA who discloses data with the significant information of Ms. DD and Mr. EE who belong to the specified disclosure range. Based on the comparison results, the server device 3 writes 0 in the disqualification flags corresponding to user IDs=0001 and 0004 of the determination result table 8T, and writes 1 in the disqualification flag corresponding to user ID=0005.

Note that, with the above description, a determination standard arranged to write 0 or 1 in a disqualification flag is whether or not the significant information of a user who discloses data is consistent with the significant information of a member belonging to the specified disclosure range. However, the conversion rules and significant information may be changed according to action history, and accordingly, an arrangement may be made wherein in the event that the significant information of a user who discloses data is similar to the significant information of a member belonging to the specified disclosure range, the member thereof is determined to be consistent with the specified disclosure range, and 0 is written in the disqualification flag thereof.

For example, in the event that there is an inclusion relation wherein the place of the action history of a user who discloses data includes the place of the action history of a member to be compared, significant information that the server device 3 generates differs between the user who discloses data and the member to be compared, and complete agreement is not realized. However, in such a case, determination may be made that the significant information of the user who discloses data is similar to the significant information of the member to be compared.

Similarly, in the event that there is an inclusion relation wherein the time of the action history of a user who discloses data includes the time of the action history of a member to be compared, determination may be made that the significant information of the user who discloses data is similar to the significant information of the member to be compared.

The server device 3 references the disqualification flags of the determination result table 8T to generate the determination result screen 2f indicating the determined result regarding each of the users extracted as members belonging to the disclosure range. The server device 3 transmits the generated determination result screens 2f to the terminal device 2. Data disclosure processing that the server device 3 will hereafter execute is the same as with the first embodiment, and accordingly, description thereof will be omitted.

Figure 22:
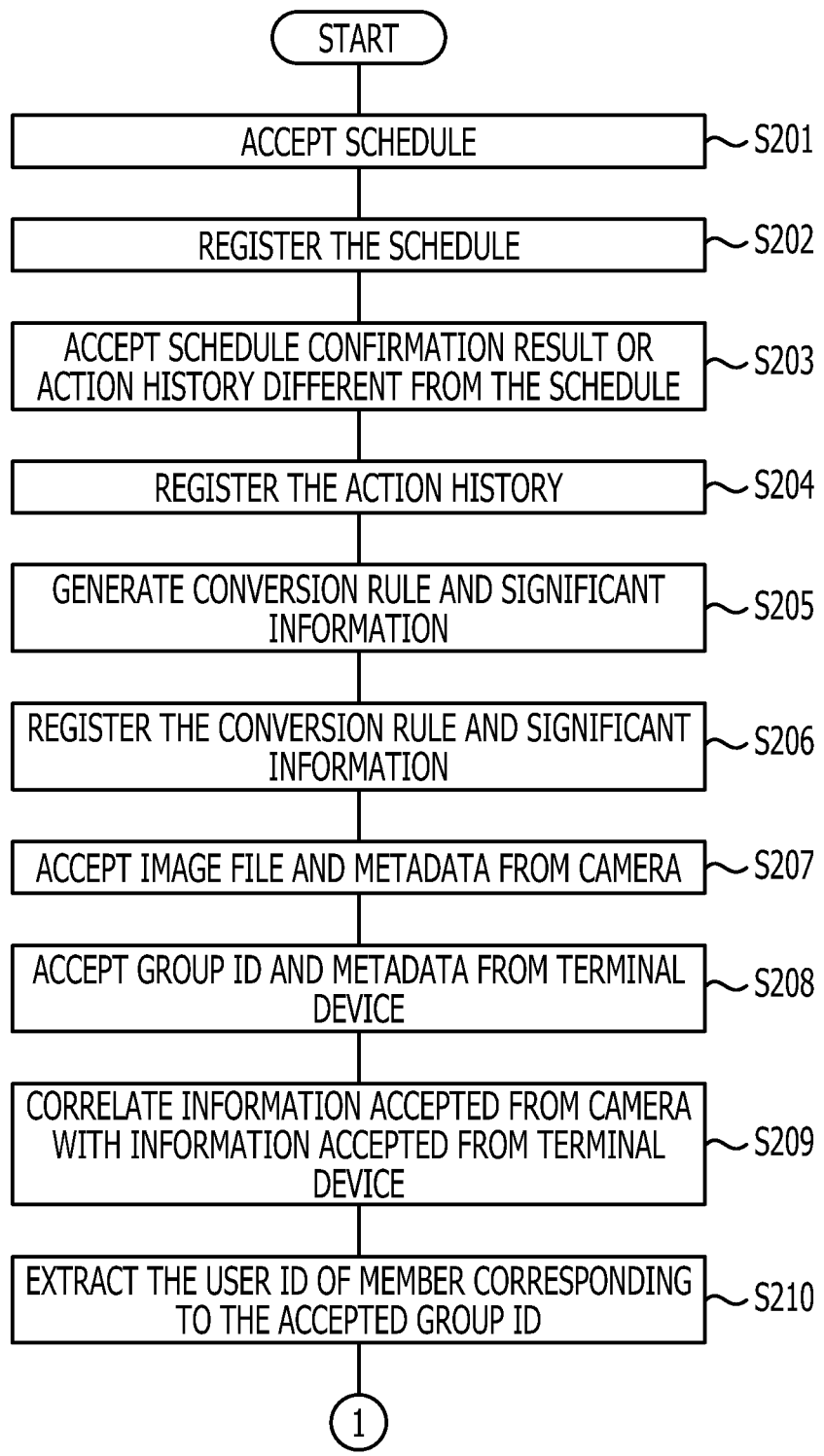
FIG. 22 is a flowchart illustrating a procedure of disclosure range determination processing that a server device executes.
Figure 23:
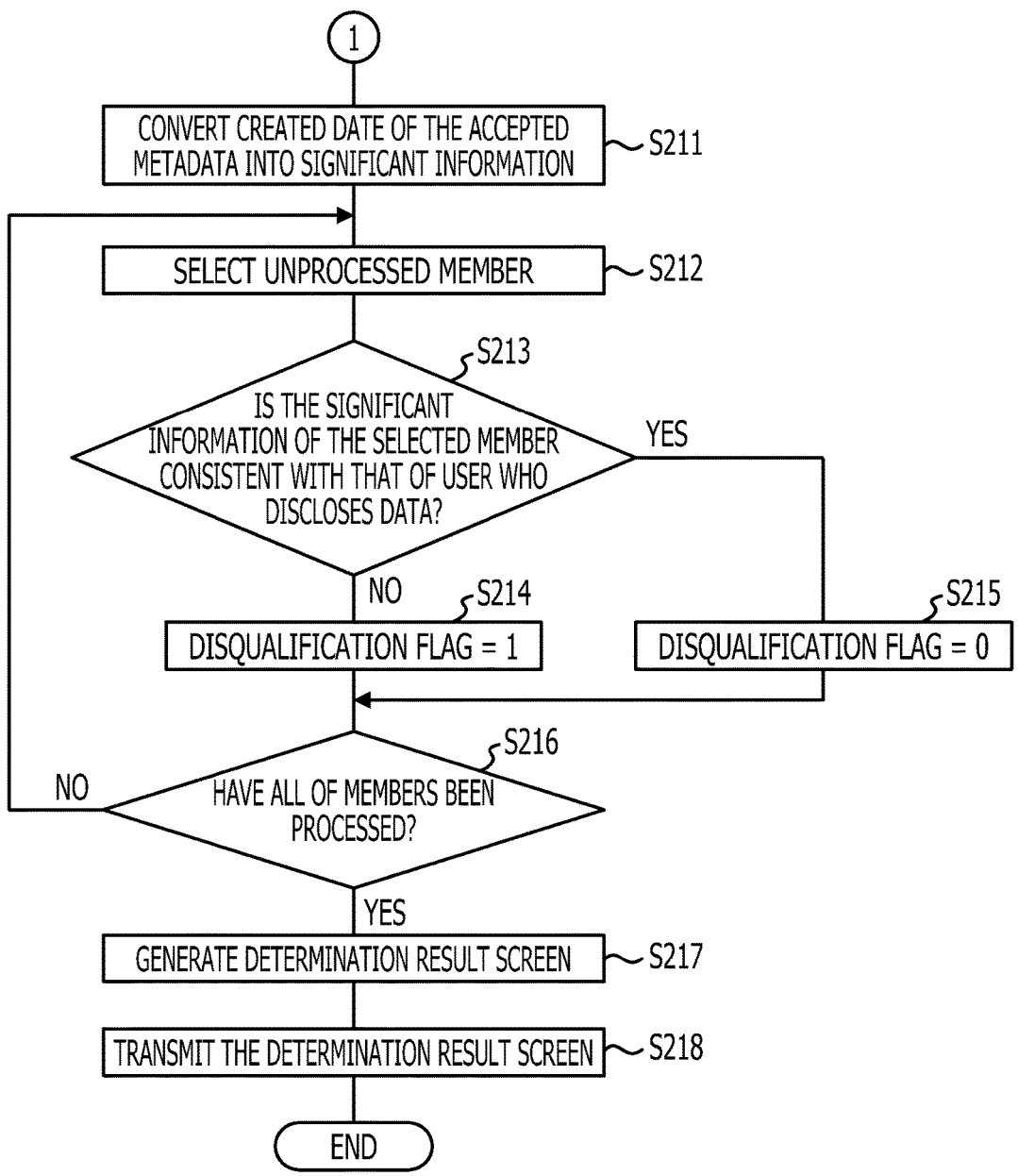
FIG. 23 is a flowchart illustrating an example of the procedure of the disclosure range determination processing that the server device executes.

FIGS. 22 and 23 are flowcharts illustrating an example of a procedure of disclosure range determination processing that the server device 3 executes.

The control unit 31 accepts the schedule for each user from the terminal device 2 (step S201). The control unit 31 registers the accepted schedule for each user in the schedule table 9T (step S202). The control unit 31 accepts, based on the schedule table 9T, a confirmation result of the schedule or action history different from the schedule (step S203). The control unit 31 registers the action history for each user in the action history table 10T according to the accepted confirmation result of the schedule or action history different from the schedule (step S204). The control unit 31 generates, based on the action history for each user registered in the action history table 10T, a conversion rule and significant information corresponding to each of the users (step S205). The control unit 31 registers the generated conversion rule and significant information for each user in the conversion rule table 60T (step S206).

The control unit 31 accepts the image file 1F and metadata 1D from the camera 2 (step S207). The control unit 31 accepts the group ID and metadata 1D from the terminal device 2 (step S208). The control unit 31 correlates information accepted from the camera 2 with information accepted from the terminal device 2 (step S209). The control unit 31 extracts the user ID of a member corresponding to the accepted group ID from the group member related table 3T (step S210).

The control unit 31 converts, based on the conversion rule table 60T, the creating date and time of the accepted metadata 1D into significant information for each extracted user ID (step S211). The control unit 31 selects, with regard to the members of user IDs excluding the user ID of a user who discloses data from the extracted user IDs, an unprocessed member regarding the following processing (step S212). The control unit 31 determines whether or not significant information corresponding to the selected member is consistent with significant information corresponding to a user who discloses data (step S213). In the event that determination is made that significant information corresponding to the selected member is not consistent with significant information corresponding to a user who discloses data (NO in step S213), the control unit 31 writes 1 in the disqualification flag in the determination result table 8T (step S214). In the event that determination is made that significant information corresponding to the selected member is consistent with significant information corresponding to a user who discloses data (YES in step S213), the control unit 31 writes 0 in the disqualification flag in the determination result table 8T (step S215).

The control unit 31 determines whether or not the processing from step S212 to step S215 has been executed regarding all of the members of the user IDs excluding the user ID of a user who discloses data from the extracted user IDs (step S216). In the event that determination is made that the processing from step S212 to step S215 has not been executed regarding all of the members described above (NO in step S216), the control unit 31 returns the processing to step S212. In the event that determination is made that the processing from step S212 to step S215 has been executed regarding all of the members described above (YES in step S216), the control unit 31 generates the determination result screen 2f (step S217). The control unit 31 transmits the generated determination result screen 2f to the terminal device 2 (step S218), and ends the processing.

With the present embodiment, the server device 3 has registered the generated conversion rule and significant information in the conversion rule table 60T, and has executed the disclosure range determination processing. However, an arrangement may be made wherein the server device 3 stores the generated conversion rule and significant information in the RAM 33, and executes the disclosure range determination processing.

With the present embodiment, the server devices 3 determines and accepts a user's action history based on a pre-created schedule. However, in the event that a user possesses a portable communication device having a GPS measurement function, a function arranged to connect to a wireless LAN access point, a function arranged to connect to a cellular phone base station, or the like, the server device 3 may take a position and time to be transmitted from this portable communication device as the user's action history. Specifically, the server device 3 stores the position and time information from the portable communication device which the user possesses in the action history table 10T as the user's action history. The server device 3 generates, based on the action history stored in the action history table 10T, a conversion rule and significant information for each user. At this time, the server device 3 may merge the stored action history for each user, or may not.

Note that, with the above description, the metadata 1D to be correlated with data has been the position of a creation place, creating date and time, a creator, and so forth which are generated at the time of creation of data. However, the metadata 1D to be correlated with data may be the position of a reproduction place, reproduced date and time, reproducing person, identification information of a reproducing device, and so forth which are generated at the time of reproducing of data. For example, let us say that, with a planning meeting held at a certain meeting room, presentation data has been reproduced at a PC, and an image thereof has been projected using a projector. In the event that the presentation data reproduced at the planning meeting will be disclosed later to only the members who participated in this planning meeting, using the data disclosure system, the disclosure range determination processing according to the present embodiment may be executed.

A PC which reproduces data stores a reproduction position of data, reproduced date and time, reproducing person, identification information of a reproducing device, and so forth correlated with the data as the metadata 1D of the data during reproduction or after reproduction. As for a room-level position determination method, known technology such as GPS, wireless LAN, cellular phone base station, or the like may be employed. On the other hand, the action history of a member who attended reproduction of the data is stored in the server device 3 using schedule management or the above-mentioned portable communication device or the like. The server device 3 generates and stores a conversion rule arranged to convert the metadata 1D of the reproduced data into significant information, and this significant information based on the members' action history. A disclosure range made up of the members who participated in the planning meeting is separately registered in the server device 3, for example. Under these preparations, the server device 3 accepts the group ID and metadata 1D, and executes the disclosure range determination processing according to the present embodiment. Thus, in the event that there is an error on the disclosure range regarding not only unreproduced data but also data after reproduction, a warning is immediately issued from the data disclosure system. Thus, unintended disclosure of data may be avoided.

According to the sever device 3, based on a user's action history, a conversion rule arranged to convert the metadata 1D, and significant information may be generated. Thus, conversion rules and significant information does not have to be registered in the conversion rule table 60T beforehand, and construction load of the data disclosure system is reduced.

The program 2P or 20P arranged to operate the terminal device 2 may be read in from the optical disc 1*a* via the disc drive 25. Alternatively, the program 2P or 20P may be read in from an external information processing device or storage device via the communication unit 26. Further, the semiconductor memory 1*c* such as flash memory or the like in which the program 2P or 20P is recorded may be implemented in the terminal device 2.

Similarly, the program 3P or 30P arranged to operate the server device 3 may be read in from the optical disc 1*a* via the disc drive 35. Alternatively, the program 3P or 30P may be read in from an external information processing device or storage device via the communication unit 36. Further, the semiconductor memory 1*c* such as flash memory or the like in which the program 3P or 30P is recorded may be implemented in the server device 3.

The second embodiment has been described so far, the others are the same as with the first embodiment, and accordingly, the corresponding portions are denoted with the same reference numerals, and detailed description thereof will be omitted.

Third Embodiment

A server device 3 according to a third embodiment determines whether or not a member belonging to a disclosure range, transmitted from the terminal device 2, qualifies as a member belonging to the disclosure range, based on the result of comparison between position information which is metadata of data to be disclosed, and the actual position information of members belonging to a disclosure range.

This will be described below in detail. Note however, that description of items which are the same as with the second embodiment will be omitted.

We will say here that data to be disclosed is an image file, in the same way as with the second embodiment.

Upon having accepted the disclosure range transmitted from the terminal device 2, the server device 3 according to the present embodiment determines whether or not an action history table 70T of members belonging to the disclosure range exists. In the event that an action history table 70T of the members exists, the server device 3 extracts the action history table 70T of these members.

FIG. 24 is an explanatory diagram illustrating an example of a record layout of the action history table 70T.

As illustrated in FIG. 24, the action history table 70T correlates point-in-time information each time a terminal device 2 of the members performs positioning and position information obtained by positioning. Each time that positioning is performed for example, the position information and point-in-time information of each member is transmitted from the terminal device 2 to the server device 3, and is recorded in the action history table 70T of each member. Accordingly, by referencing the action history table 70T of each member, the server device 3 can comprehend where each member was at what time, i.e., the actual position information. Note that GPS or the like may be used as a positioning method by the terminal device 2.

Further, upon having received the image file 1F and metadata 1D transmitted from the camera 1, the server device 3 records the point-in-time information and position information, which is the metadata 1D, as a conversion rule item in a conversion rule table 80T.

FIG. 25 is an explanatory diagram illustrating an example of a record layout of the conversion rule table 80T.

The point-in-time information and position information here are, respectively, shooting point-in-time and shooting position information, of the camera 1. Accordingly, the server device 3 stores the shooting point-in-time and shooting position information to the conversion rule item of the conversion rule table 80T, for each image file 1F. Note that while the conversion rule table 80T corresponds to the conversion rule table 60T according to the second embodiment, but the conversion rule table 80T according to the present embodiment assigns each row to each image file 1F transmitted from the camera 1.

Further, the server device 3 selects records of disclosed individuals from the action history table 10T, and obtains information recorded in the location item in the records, i.e., the names of locations. Next, the server device 3 selects records of image files 1F to be disclosed from the conversion rule table 80T, and records the location names obtained from the action history table 10T in the significant information item of the records. Thus, with the conversion rule table 80T, the shooting point-in-time and shooting position by the camera 1, and the actual name of the location where the image file 1F was shot, are correlated for each image file 1F.

Further, the server device 3 selects records of disclosed individuals from the conversion rule table 80T, and extracts one of the point-in-time information recorded in the conversion rule item in the records. Next, the server device 3 extracts point-in-time information, closest to the extracted point-in-time information, from the point-in-time information recorded in the action history table 70T of the members. Next, the server device 3 obtains position information linked to the point-in-time information extracted from the action history table 70T, and determines whether or not this position information correlates with the name of a location recorded in the significant information in the conversion rule table 80T.

Now, in the event that the position information extracted from the action history table 70T corresponds to the name of the location stored in the significant information of the conversion rule table 80T, the server device 3 determines that this member was in fact at that location, and determines the member to be qualified to be disclosed. On the other hand, in the event that the position information extracted from the action history table 70T does not correspond to the name of the location stored in the significant information of the conversion rule table 80T, the server device 3 determines that this member was not actually at that location, and determines the member to be unqualified to be disclosed. Subsequent processing is the same as with the second embodiment, so description will be omitted.

Thus, qualification of members belonging to a disclosure range specified by the terminal device 2 may be determined by determining whether or not actual position information of members belonging to the disclosure range correspond to the shooting position of an image file 1F to be disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A disclosure range determination method executed by a computer coupled to a device and configured to determine whether a disclosure range of data designated by the device includes an error, the disclosure range determination method comprising:
receiving data, information of a plurality of members which disclose the data, metadata of the data, and identification information of a user of a camera which is different from the device, the metadata including a position where the data was generated, a date and a time when the data was generated and a user identifier for identifying a user of the device, the data, the metadata and the identification information being transmitted from the camera;
extracting a mail address corresponding to each of the plurality of members;
generating, by a server device and based on action history of members, a first conversion rule related to the position, the date and the time, and a condition for disclosing the data for each of the plurality of members by
receiving a schedule for each of the plurality of members from the device;
storing the received schedule for each of the plurality of members;
receiving, based on the stored schedule, a confirmation result of the schedule or action history different from the schedule;
storing the action history for each of the plurality of members according to the confirmation result of the schedule or the action history different from the schedule; and
generating the first conversion rule and the condition corresponding to each of the plurality of members;
converting the metadata into the condition for each of the plurality of members using the first conversion rule;
converting the condition for each of the plurality of members into a keyword using a second conversion rule related to the condition; and
determining whether the keyword for each of the plurality of members is consistent with the condition corresponding to the identification information of the user of the camera.

2. The disclosure range determination method according to claim 1, wherein the condition includes a geographic name, organization, or facility relating to the position, or an action classification or whereabouts location of a member relating to the data and the time.

3. A disclosure range determination apparatus coupled to a device and configured to determine whether a disclosure range of data designated by the device includes an error, the disclosure range determination apparatus comprising:
a memory; and
a processor coupled to the memory and configured to:
receive data, information of a plurality of members to which disclose the data, metadata of the data, and identification information of a user of a camera which is different from the device, the metadata including a position where the data was generated, a data and a time when the data was generated and a user identifier for identifying a user of the device, the data, the metadata and the identification information being transmitted from the camera;
extract a mail address corresponding to each of the plurality of members;
generate, based on action history of members, a first conversion rule related to the position, the date and the time, and a condition for disclosing the data of the plurality of members by
receiving a schedule for each of the plurality of members from the device;
storing the received schedule for each of the plurality of members;
receiving, based on the stored schedule, a confirmation result of the schedule or action history different from the schedule;
storing the action history for each of the plurality of members according to the confirmation result of the schedule or the action history different from the schedule; and
generating the first conversion rule and the condition corresponding to each of the plurality of members;
converting the metadata into the condition for each user using the first conversion rule;
convert the condition for each of the plurality of members into a keyword using a second conversion rule related to the condition; and
determine whether the keyword for each of the plurality of members is consistent with the condition corresponding to the identification information of the user of the camera.

4. A non-transitory computer-readable storage medium storing a program that causes a computer to execute a process, the computer being coupled to a device and configured to determine whether a disclosure range of data designated by the device includes an error, the process comprising:
receiving data, information of a plurality of members which disclose the data, metadata of the data, and identification information of a user of a camera which is different from the device, the metadata including a position where the data was generated, a date and a time when the data was generated and a user identifier for identifying a user of the device, the data, the metadata and the identification information being transmitted from the camera;
extracting a mail address corresponding to each of the plurality of members;
generating, based on action history of members, a first conversion rule related to the position, the date and the time, and a condition for disclosing the data for each of the plurality of members by
receiving a schedule for each of the plurality of members from the device;
storing the received schedule for each of the plurality of members;
receiving, based on the stored schedule, a confirmation result of the schedule or action history different from the schedule;
storing the action history for each of the plurality of members according to the confirmation result of the schedule or the action history different from the schedule; and
generating the first conversion rule and the condition corresponding to each of the plurality of members;
converting the metadata into the condition for each of the plurality of members using the first conversion rule;

converting the condition for each of the plurality of members into a keyword using a second conversion rule related to the condition; and determining whether the keyword for each of the plurality of members is consistent with the condition corresponding to the identification information of the user of the camera.

\* \* \* \* \*